(12) United States Patent
Pahk et al.

(10) Patent No.: US 12,216,044 B2
(45) Date of Patent: Feb. 4, 2025

(54) SYSTEM FOR MEASURING THICKNESS AND PHYSICAL PROPERTIES OF THIN FILM USING SPATIAL LIGHT MODULATOR

(71) Applicant: SEOUL NATIONAL UNIVERSITY R&DB FOUNDATION, Seoul (KR)

(72) Inventors: Heui Jae Pahk, Seoul (KR); Seung Woo Lee, Seoul (KR); Min Gyu Kim, Cheongju-si (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 177 days.

(21) Appl. No.: 18/003,998

(22) PCT Filed: Mar. 29, 2021

(86) PCT No.: PCT/KR2021/003819
§ 371 (c)(1),
(2) Date: Dec. 30, 2022

(87) PCT Pub. No.: WO2022/025385
PCT Pub. Date: Feb. 3, 2022

(65) Prior Publication Data
US 2023/0266233 A1    Aug. 24, 2023

(30) Foreign Application Priority Data
Jul. 31, 2020 (KR) .................. 10-2020-0096114

(51) Int. Cl.
*G01N 21/31* (2006.01)
*G01B 11/06* (2006.01)
*G02B 27/28* (2006.01)

(52) U.S. Cl.
CPC ............. *G01N 21/31* (2013.01); *G01B 11/06* (2013.01); *G02B 27/283* (2013.01); *G02B 27/286* (2013.01); *G01N 2201/08* (2013.01)

(58) Field of Classification Search
CPC ............... G01B 11/06; G01B 11/0625; G01B 11/0641; G01J 1/02; G01J 1/04;
(Continued)

(56) References Cited

U.S. PATENT DOCUMENTS 7,006,224 B2    2/2006  Some
7,042,580 B1    5/2006  Stanke et al.
(Continued)

FOREIGN PATENT DOCUMENTS

JP    2006184060 A    12/2004
JP    2009192331 A    2/2008
(Continued)

OTHER PUBLICATIONS

Korean Request for the Submission of an Opinion for Appln No. 10-2020-0096114 submitted Mar. 13, 2022, all pages.
(Continued)

*Primary Examiner* — Hina F Ayub
(74) *Attorney, Agent, or Firm* — Kilpatrick Townsend & Stockton LLP

(57) ABSTRACT

System for measuring the thickness and properties of a thin film using a spatial light modulator according to the inventive concept includes: a spatial light modulator; a first beam splitter; an objective lens; a second beam splitter; a first camera configured to acquire a surface image of the sample; an optical fiber equipped with a light receiving unit to receive reflected light passing through a certain area of a back focal plane of the objective lens; and a spectrometer configured to measure an intensity of light received from the optical fiber and output the measured intensity as an electrical signal.

14 Claims, 28 Drawing Sheets

(58) Field of Classification Search
CPC ......... G01J 9/00; G01N 21/211; G01N 21/31; G01N 21/55; G01N 2201/08; G02B 27/283; G02B 27/286
See application file for complete search history.

(56) References Cited

U.S. PATENT DOCUMENTS

| | | | |
|---|---|---|---|
| 10,823,663 | B2 | 11/2020 | Liu et al. |
| 2006/0109483 | A1 | 5/2006 | Marx et al. |
| 2012/0140243 | A1* | 6/2012 | Colonna de Lega ........................ G01B 11/2518 356/609 |
| 2019/0219379 | A1 | 7/2019 | Ishigaki et al. |
| 2022/0003539 | A1* | 1/2022 | Ghim ................... G01B 9/0201 |
| 2023/0324283 | A1* | 10/2023 | Zawaideh ............ G01N 21/211 |

FOREIGN PATENT DOCUMENTS

| | | | |
|---|---|---|---|
| JP | 4805674 | B2 | 11/2011 |
| KR | 20120053710 | A | 5/2012 |
| KR | 10-1519932 | B1 | 5/2015 |
| KR | 10-2132095 | B1 | 7/2020 |
| KR | 2011209 | B1 | 11/2020 |
| KR | 20200132572 | A | 11/2020 |
| KR | 10-2270190 | B1 | 6/2021 |

OTHER PUBLICATIONS

Korean Written Decision on Registration for Appln No. 10-2020-0096114 dispatched Jul. 26, 2022, all pages.
International Search Report for PCT/KR2021/003819 mailed Jul. 2, 2021, all pages.

* cited by examiner

SYSTEM FOR MEASURING THICKNESS AND PHYSICAL PROPERTIES OF THIN FILM USING SPATIAL LIGHT MODULATOR

TECHNICAL FIELD

The inventive concept relates to a reflectometry or ellipsometry system capable of measuring the thickness and physical properties of a thin film.

BACKGROUND ART

Reflectometry refers to a method and equipment for analyzing the thickness or physical properties of a sample by measuring a signal of light reflected by the sample from incident light thereon. Among the thin film thickness measurement methods using optics, spectroscopic reflectometry, which measures the thickness of a sample based on the spectral reflectivity characteristics of the sample, has the fastest measurement speed and is known to be applicable to mass production lines. A spectroscopic reflectometry device has a vertical incident reflection structure as shown in FIG. 1 in consideration of the convenience of equipment operation and measures the reflectance R of the sample by measuring the incident light quantity $I_i$ and the reflected light quantity $I_r$. Based on the measured reflectivity, compared with the theoretical reflectivity calculated by changing the thickness and refractive index of the sample, the thickness of the actual sample may be known by inferring the theoretical thickness and refractive index at which the error is minimal.

When light is incidentally reflected on a thin film sample, the plane including the incident and reflection paths of light is defined as the plane of incidence. A polarized light perpendicular to the plane of incidence is defined as an S wave, and a polarized light parallel to the plane of incidence is defined as a P wave. The single-layer thin film sample is composed of three media $N_1$, $N_2$, and $N_3$, as may be seen in the right side of FIG. 2. The medium $N_1$ is an external environment connected to a light source, such as a vacuum or atmosphere, and the medium $N_2$ is a target material for which a physical quantity is to be measured. The medium $N_3$ is below the medium $N_2$ and is separated from the medium $N_1$, which is the external environment, by the medium $N_2$. For example, the medium $N_1$ may be vacuum, the medium $N_3$ may be a semiconductor substrate, and the medium $N_2$ may be a thin film deposited on a semiconductor substrate whose thickness is to be measured. In addition, the reflectivity of the sample is expressed according to the equation below. Light 10 passes through the medium $N_1$ from the external environment connected to the medium $N_1$ and is incident on the interface between the medium $N_1$ and the medium $N_2$ at an angle $\varphi_1$. According to Fresnel's law, some of the incident light is reflected to the medium $N_1$ at an angle $\varphi1$ equal to the angle of incidence as shown by 10r, and some is transmitted to the medium $N_2$ at an angle $\varphi2$ as shown by 10t. The angle $\varphi_2$ of the transmitted light is different from the angle of incidence $\varphi_1$, which is determined by the size of the angle of incidence $\varphi_1$ and the refractive indices of the media $N_1$ and $N_2$. When the interfaces of the media $N_1$, $N_2$, and $N_3$ are parallel, the transmitted light 10t is incident on the interface between the media $N_2$ and $N_3$ at an angle $\varphi_2$, a part thereof is reflected into the medium $N_2$ at the same angle $\varphi_2$ as shown in 20r, and a part thereof is transmitted into the medium $N_3$ at an angle $\varphi_3$ as shown by 20t. The light 20r reflected by the medium $N_2$ arrives at the interface between the medium $N_2$ and the medium $N_1$, and a part thereof is reflected to the medium $N_2$ at an angle $\varphi_2$ as shown by 30r, and a part thereof is transmitted to the medium $N_1$ at an angle $\varphi_1$. Therefore, the reflected light with respect to the incident light 10 may be superimposed with the light 30t transmitted through the medium $N_2$, reflected at the interface between the medium $N_2$ and the medium $N_3$, and transmitted at the interface between the medium $N_2$ and the medium $N_1$ and the light 50t, 70t, ... transmitted from the medium $N_1$ after being transmitted through the medium $N_2$ and reflected several times at the interface between the medium $N_2$ and the medium $N_3$ and at the interface between the medium $N_2$ and the medium $N_1$ in addition to the light 10r reflected directly at the interface between the medium $N_1$ and the medium $N_2$.

According to Fresnel's law, the total reflection coefficient of reflected light may be expressed as:

$$R(\lambda, \phi_1) = \frac{r_{12}(\lambda, \phi_1) + r_{23}(\lambda, \phi_2)\exp(-j2\beta(\lambda, \phi_2))}{1 + r_{12}(\lambda, \phi_1)r_{23}(\lambda, \phi_2)\exp(-j2\beta(\lambda, \phi_2))} \quad \text{Equation (1)}$$

where $\beta$ is expressed as:

$$\beta(\lambda, \phi_2) = 2\pi \frac{d}{\lambda} \tilde{N}_2(\lambda)\cos\phi_2 \quad \text{Equation (2)}$$

Also, $r_{12}$ and $r_{23}$ are the reflectance between the medium $N_1$ and the medium $N_2$ and the reflectance between the medium $N_2$ and the medium $N_3$, respectively, $\lambda$ is the wavelength of the incident light, d is the thickness of the medium $N_2$, $\varphi_1$ is the angle of incidence, and $\varphi_2$ is the angle (angle of refraction) when transmitted from the medium $N_1$ to the medium $N_2$. The reflectance R, which is the ratio of the intensity of the reflected light $I_r(\lambda, \varphi_2)$ to the incident light $I_i(\lambda, \varphi1)$, may be expressed as follows.

$$R(\lambda, \phi_1) = |R(\lambda, \phi_1)|^2 = \frac{I_r(\lambda, \phi_1)}{I_i(\lambda, \phi_1)} \quad \text{Equation (3)}$$

As a result, it may be seen that the reflectivity measured from the sample is a function of the wavelength of light and the angle of incidence incident on the sample.

From this relationship, the reflectance, which is the ratio of the intensity of the incident light to the intensity of the reflected light, may be obtained by measurement, and through comparison with the measured data and theoretical values of this reflectance and wavelength, the thin film thickness of the theoretical value having the closest value may be selected as the thickness of the actual sample thin film.

However, there are several problems in applying this measurement method to mass production process management.

First, as the pattern size of the target sample decreases and the measurement demand for fine patterns increases, a small spot size incident area through a high magnification optical system is required. The display industry is steadily developing with the goal of high resolution and large screen, and the size of the display pattern is getting smaller due to this trend, and accordingly, the demand for measurement of a fine pattern is also increasing. Currently, in the field of display industry, there is a demand for measurement with a spot size of 4 um or less, and in the semiconductor field, measurement with a spot size of several tens to hundreds of nm is required.

Technologies that have emerged to meet these measurement needs are micro-spot spectroscopic reflectometry and imaging spectroscopic reflectometry. Micro-spot spectroscopic reflectometry is a technology that reduces the size of a measurement spot by changing the objective lens with a higher magnification objective lens in the conventional hardware structure of FIG. 1. Imaging spectroscopic reflectometry uses a camera as a detector, instead of the spectrometer used in the existing spectroscopic reflectometry, as shown in FIG. 3, and such a device acquires a spectral reflectance signal for a region by an imaging method by attaching a number of short wavelength filters or a device capable of wavelength scanning to the light source. Therefore, in the case of imaging spectroscopic reflectometry, the reflectivity of a region may be measured, and the spatial resolution (Spot Size) may be reduced as much as the magnification of the objective lens and the resolution of the camera.

Both of the above methods basically reduce the spot size through a high magnification objective lens. However, when using a high magnification objective, due to the large Numerical Aperture (NA) of the objective lens, reflectivity signals corresponding to various angles of incidence other than normal incident reflection overlap and enter the detector. As a result of actually measuring through micro-spot spectroscopic reflectometry, as may be seen in FIG. 4, as the magnification of the objective lens increases in the same sample, distortion of the reflectance signal occurs. Due to such signal distortion, comparison with theoretical signals in thickness and refractive index measurements is difficult, and measurement accuracy is lowered. Some of these problems may be solved through theoretical signal modeling that takes into account the effect of multiple angles of incidence on the objective lens, but the theoretical signal modeling formula increases the computation time due to the integration process for multiple angles of incidence, and there is a problem in that it is difficult to measure in general, and it is necessary to additionally know the distribution of the amount of light for each incident angle. In addition, in the case of imaging spectroscopic reflectometry, the wavelength resolution is determined by the short wavelength filtering device, and in general, there is a problem that the wavelength resolution is low and the amount of light is low due to the wavelength filtering structure.

On the other hand, unlike a reflectometer, there is an ellipsometry method that measures the complex refractive index of a material according to a wavelength by injecting polarized light into a sample and analyzing the polarized reflected light reflected by the sample by a spectrometer. In ellipsometry, polarized light is incident on a sample and the thickness and properties of the sample are analyzed. Among the optical thin film thickness measurement methods, ellipsometry, which measures the thickness of a sample based on the polarization change characteristic of the sample, is known as the most accurate and precise thickness measurement method. The ellipsometry system has an inclined incident reflection structure as shown in FIG. 5, and the incident stage, Polarization State Generator (PSG), creates various polarizations and irradiates the sample, and the polarization state analyzer (PSA) analyzes the reflected polarization to measure the polarization change in the sample. Through this process, the complex reflectance characteristic of the sample is measured, and the measured complex reflectivity is compared with the theoretical complex reflectivity calculated by changing the thickness and refractive index of the sample to calculate the theoretical thickness and refractive index at which the error is minimized.

A more detailed description of the ellipsometry system is as follows. When light is incidentally reflected obliquely to a sample, as shown in FIG. 6, a plane including an incident path and a reflection path of light is defined as plane of incidence, a polarized light perpendicular to the plane of incidence is defined as an S wave, and a polarized light parallel to the plane of incidence is defined as a P wave.

At this time, if the P-wave component of the reflected light is $\tilde{r}_p$ and the S-wave component is $\tilde{r}_s$, the relationship shown in Equation (4) is established. That is, information about the sample (thin film thickness, refractive index, sample shape, etc.) may be measured through the amplitude ratio tan(ψ) and the phase difference $\Delta$ of the P-wave component and the S-wave component of the reflected light.

$$\frac{\tilde{r}_p}{\tilde{r}_s} = \tan(\Psi)e^{j\Delta} \qquad \text{Equation (4)}$$

A measuring system or device based on this principle is an ellipsometry device, and the larger the oblique incidence angle, the greater the phase difference of the reflected light, which is advantageous for signal analysis, such that general ellipsometry has an inclined incident reflection structure. By comparing the measured polarization signals ($\Psi_{measure}$, $\Delta_{measure}$) with the signals ($\Psi_{theory}$, $\Delta_{theory}$) calculated through the reflectivity theory that fits the sample characteristics, desired information (thin film thickness, refractive index, sample shape, etc.) may be calculated from the sample through non-linear fitting. Since the polarization signals ($\Psi_{theory}$, $\Delta_{theory}$), <<img2>> are functions according to the wavelength of light, the angle of incidence, etc., to avoid problems such as local minimum in the nonlinear fitting process, it is advantageous and known to use a broad-band spectral analysis or a multi-incidence angle analysis.

Since ellipsometry must generate and interpret polarized signals, it includes a Polarization State Generator (PSG) at the incident light end and a Polarization State Analyzer (PSA) at the reflected light end. Optical devices used to generate and analyze the polarization state of light include a polarizer, a retarder, a compensator, and a polarization rotor, and in addition to a single optical component, various components such as a liquid crystal, a polarization interferometer, and a fiber polarizer may be used. Among them, the hardware configuration of general ellipsometry uses two linear polarizers or analyzers and two compensators as shown in FIG. 5. This is called the Polarizer-Compensator-Sample-Compensator-Analyzer (PCSCA) structure, and two compensators rotate at the ratio of w1 and w2 respectively and measure the amount of light for each rotation angle, and an amplitude ψ and a phase difference $\Delta$ are measured through the Fourier analysis method for the measured light quantity.

In applying ellipsometry to mass production process management in industrial sites, small spot size and large area measurement technology through a high magnification optical system are required. The display industry is steadily developing with the goal of high resolution and large screen, and the size of the display pattern is getting smaller according to this trend. Accordingly, the demand for measurement of fine patterns is also increasing. Currently, in the field of display industry, there is a demand for measurement with a spot size of 4 um or less, and in the semiconductor field, measurement with a spot size of several tens to hundreds of nm is required.

A technique that has emerged to meet these measurement needs is imaging ellipsometry. Imaging ellipsometry has a structure in which an objective lens and a camera are applied to enable imaging in ellipsometry with an existing inclined incident reflection structure. Through this, it became possible to measure ellipsometry with a spot size reduced by the magnification of the objective lens and the resolution of the camera, and two-dimensional ellipsometry measurement for the sample area became possible. However, conventional imaging ellipsometry of these structures has 1) an image distortion problem due to oblique imaging of the sample and an ellipsometry signal distortion problem due to out-of focus in some areas, 2) a problem that high magnification objective lens (10× or more) cannot be applied due to the short working distance of the high magnification objective lens due to its oblique incident reflection structure and it is difficult to further improve spatial resolution, and 3) a problem that only ellipsometry signals corresponding to a single wavelength may be measured using a camera as a detector, making it difficult to interpret signals of broadband wavelengths.

In addition, to measure the ellipsometry parameter of the sample, in conventional imaging ellipsometry, a polarizer or a retarder is mechanically rotated in the PSG to create modulated polarization for each measurement sequence. In the case of mechanical polarization modulation, a beam drifting error that changes the optical path occurs due to the fine misalignment of the optical component, and due to this, there is a problem in that the measurement time also increases.

DISCLOSURE

Technical Problem

An object of the inventive concept is to solve the problems as described above, and to provide a system for measuring the thickness and properties of a thin film using a spatial light modulator with significantly improved measurement accuracy and analysis precision in which by improving the configuration of the conventional spectroscopic imaging reflectometer, light may be incident only on the certain area of the thin film sample, and among the reflected light reflected from the sample, only the signal corresponding to the certain incident angle and reflection angle may be selectively acquired and analyzed.

Technical Solution

To achieve the above object, a system for measuring thickness and properties of a thin film using a spatial light modulator according to the inventive concept includes: a spatial light modulator spatially modulated so that light emitted from a light source irradiates only a certain area of a sample;
  a first beam splitter configured to change a direction of the light modulated by the spatial light modulator and pass a part of a reflected light reflected from the sample;
  an objective lens configured to condense the light refracted by the first beam splitter to a certain area of the sample;
  a second beam splitter in which a part of the reflected light reflected from the sample is separated from the first beam splitter and changed after being incident;
  a first camera configured to acquire a surface image of the sample by the reflected light incident from the second beam splitter;
  an optical fiber equipped with a light receiving unit to receive reflected light passing through a certain area of a back focal plane of the objective lens; and
  a spectrometer configured to measure an intensity of light received from the optical fiber and outputs the measured intensity as an electrical signal.

Advantageous Effects

In relation to a system for measuring the thickness and properties of a thin film using a spatial light modulator according to the inventive concept, through the spatial light modulator, incident light may be irradiated only to the certain area of the sample, so the measurement resolution is remarkably improved and since the light receiving unit of the optical fiber is arranged so that only the reflected signal of a certain angle of incidence passing through the back focal plane of the objective lens may be acquired and analyzed, the effect of significantly improving the wavelength resolution is provided by excluding the effect of multiple incident angles and using a spectrometer as a detector.

In addition, as in a preferred embodiment of the inventive concept, if a polarization generating stage that does not physically move is disposed on the path of the incident light and a polarization analysis stage that does not physically move is placed on the path of the reflected light, it is possible to control the polarization of the incident light incident on the sample and thus, serve as a polarimeter. In addition, while the coaxial optical system eliminates the distortion that occurs in the oblique image and reduces the spot size of the incident light by applying a high magnification objective lens, the position of incident light may be changed by the spatial light modulator, such that it is possible to measure a large area, and using a spectrometer as a detector has the advantage of measuring a signal with high wavelength resolution in the two-dimensional area of the sample. In addition, since the polarization generating stage and the polarization analysis stage have a physically fixed structure in the polarization modulation process, the measurement time and the measurement sequence are significantly shortened compared to the conventional ellipsometry.

BEST MODE

Hereinafter, preferred embodiments of the inventive concept will be described in detail with reference to the accompanying drawings.

Figure 1:
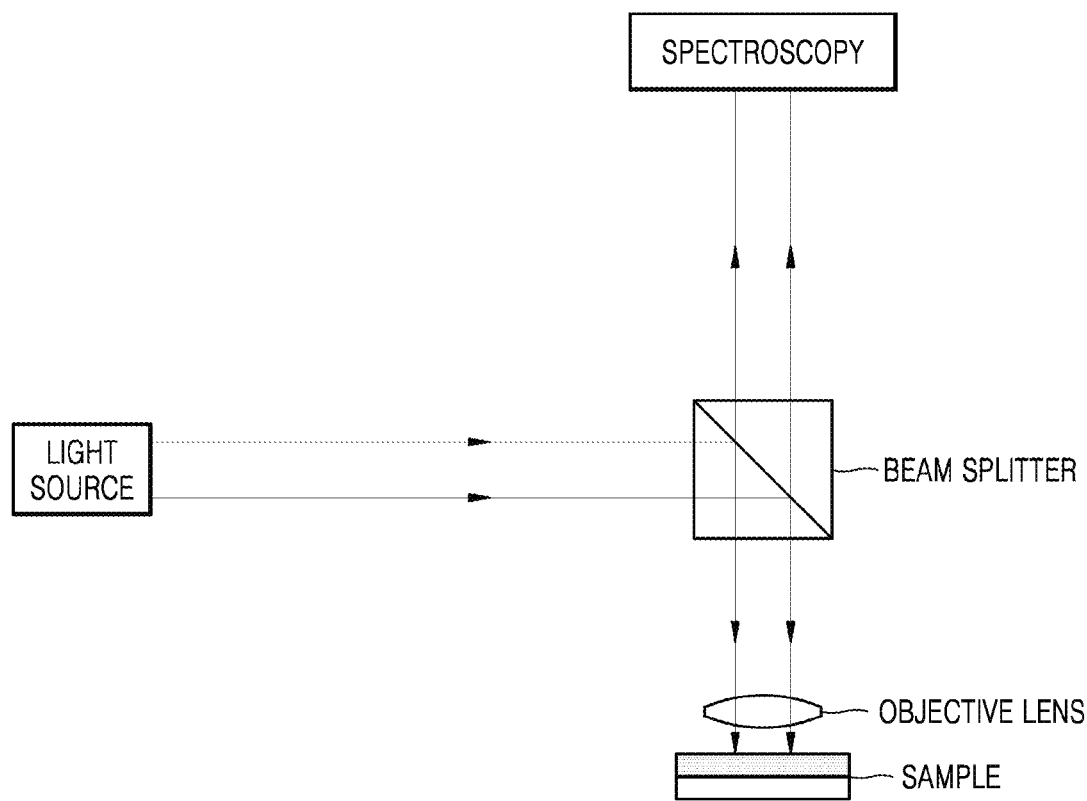
FIG. 1 is a view showing the structure of a conventional spectroscopic reflectometry.
Figure 2:
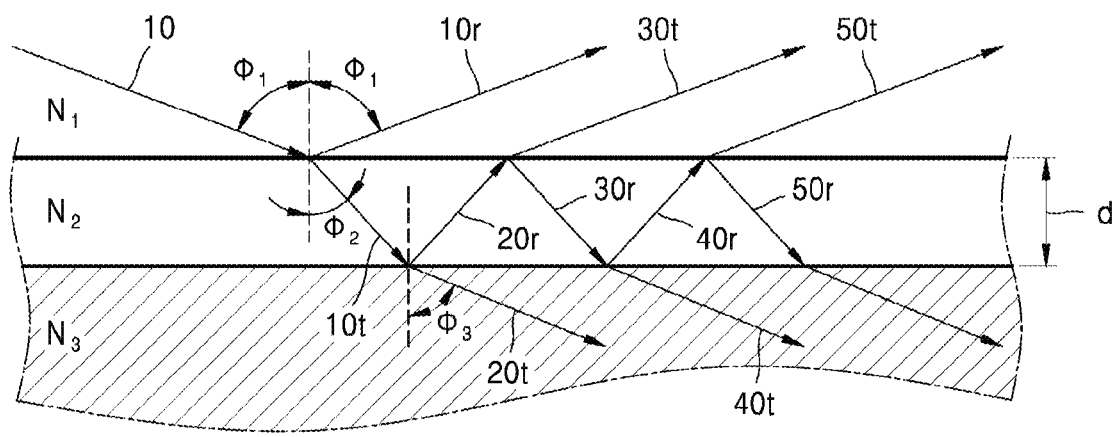
FIG. 2 is a view showing the incident, transmission, and reflection paths of light in a thin film sample.
Figure 3:
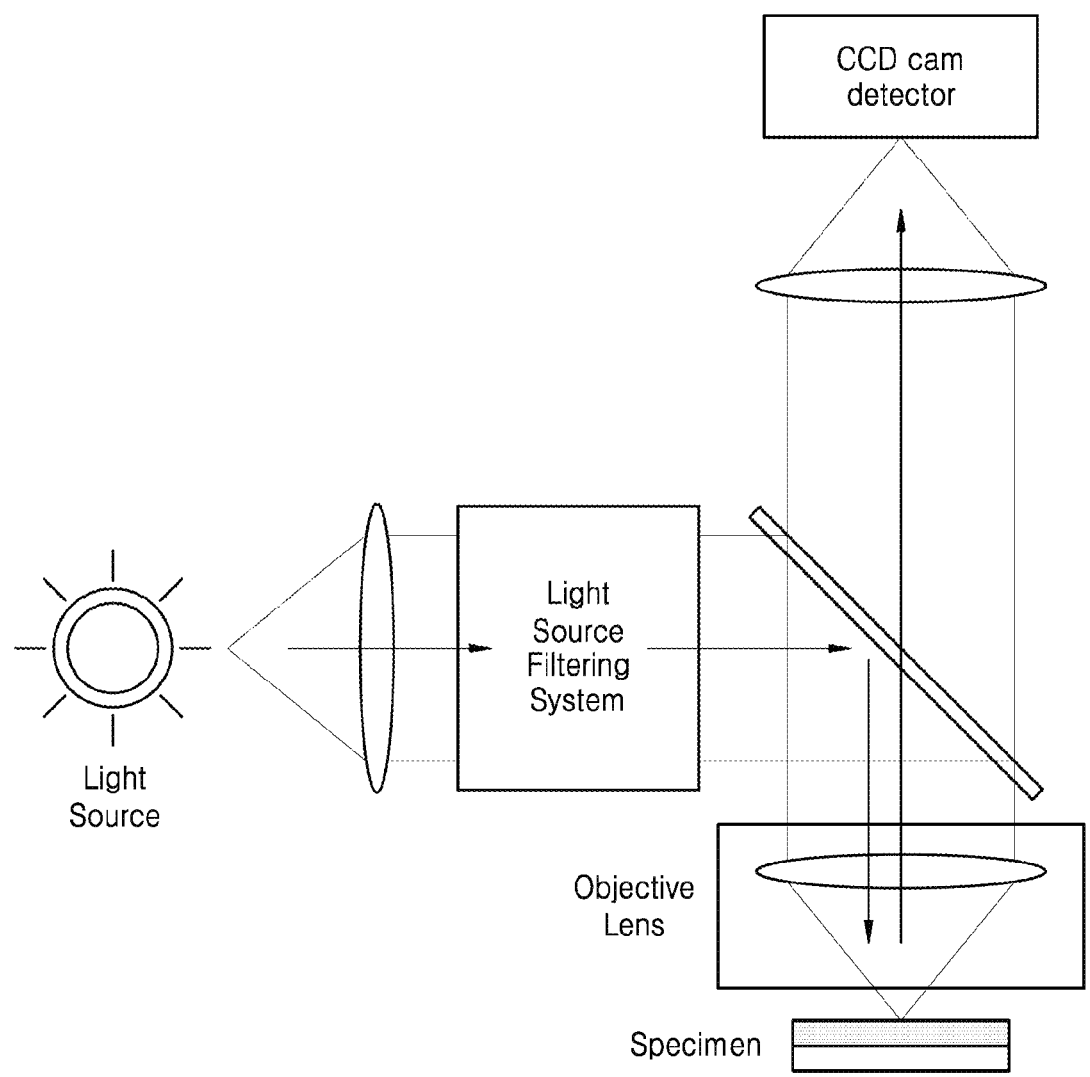
FIG. 3 is a block diagram of a conventional spectroscopic imaging reflectometer.
Figure 4:
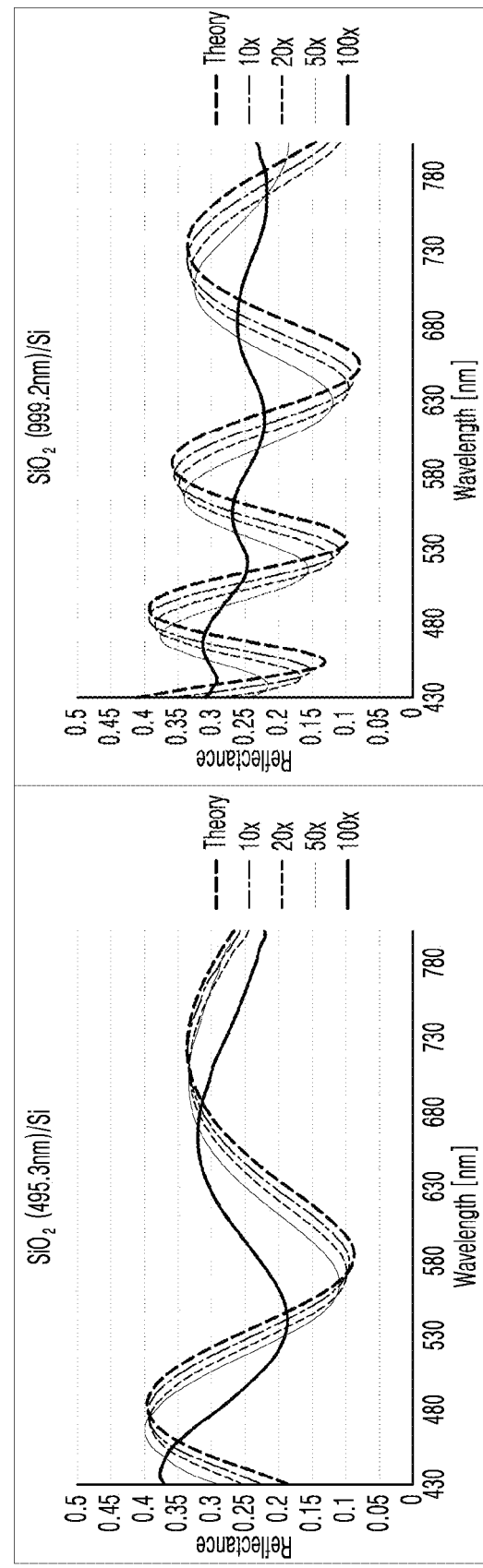
FIG. 4 is a view showing measurement results of magnification and spectral reflectivity of an objective lens in a conventional reflectometer.
Figure 5:
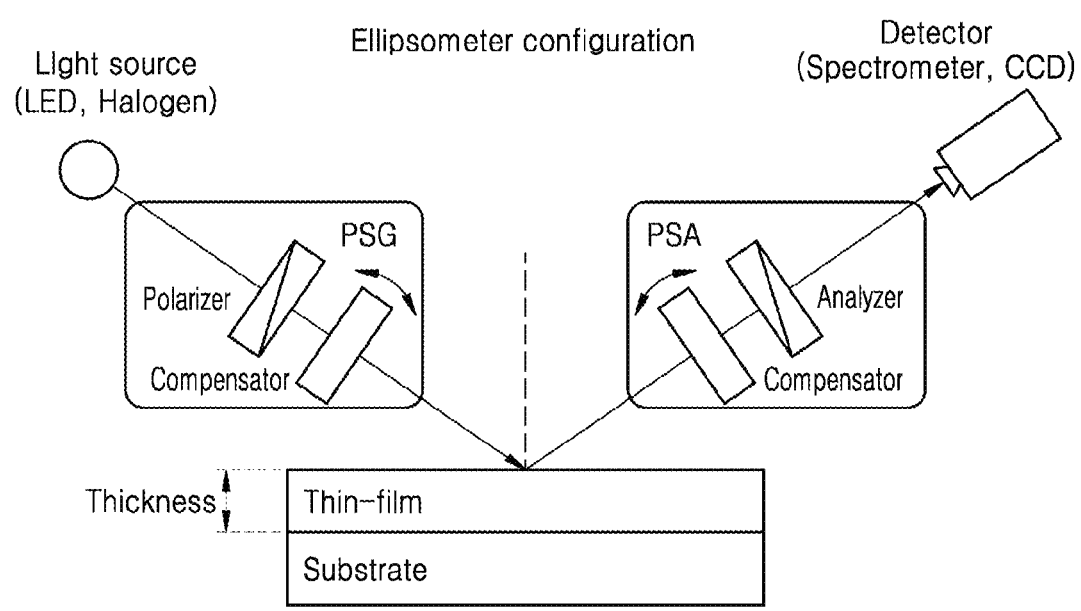
FIG. 5 is a diagram showing the structure of a conventional ellipsometry system.
Figure 6:
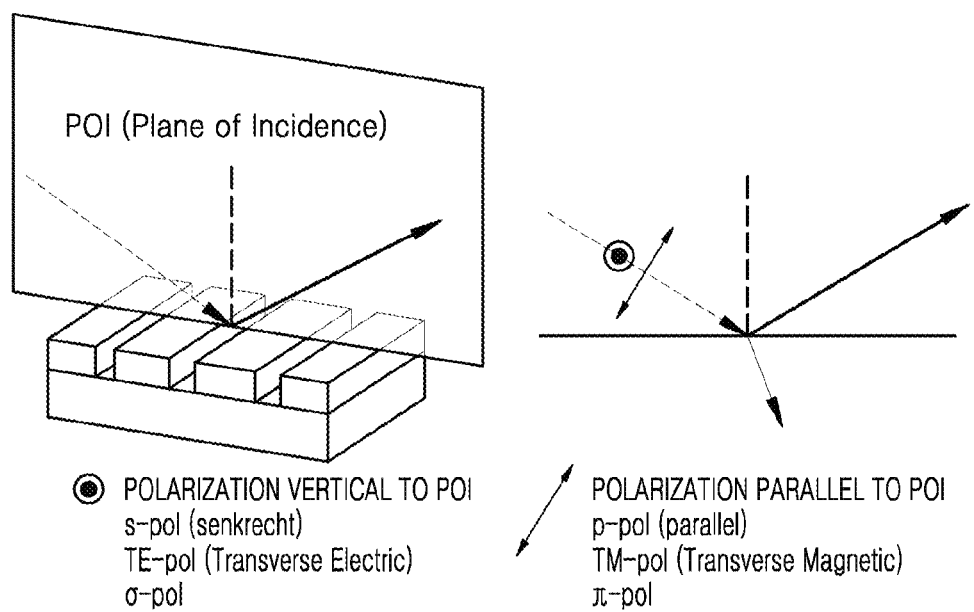
FIG. 6 is a diagram schematically illustrating an incident plane and definitions of P-waves and S-waves.
Figure 7:
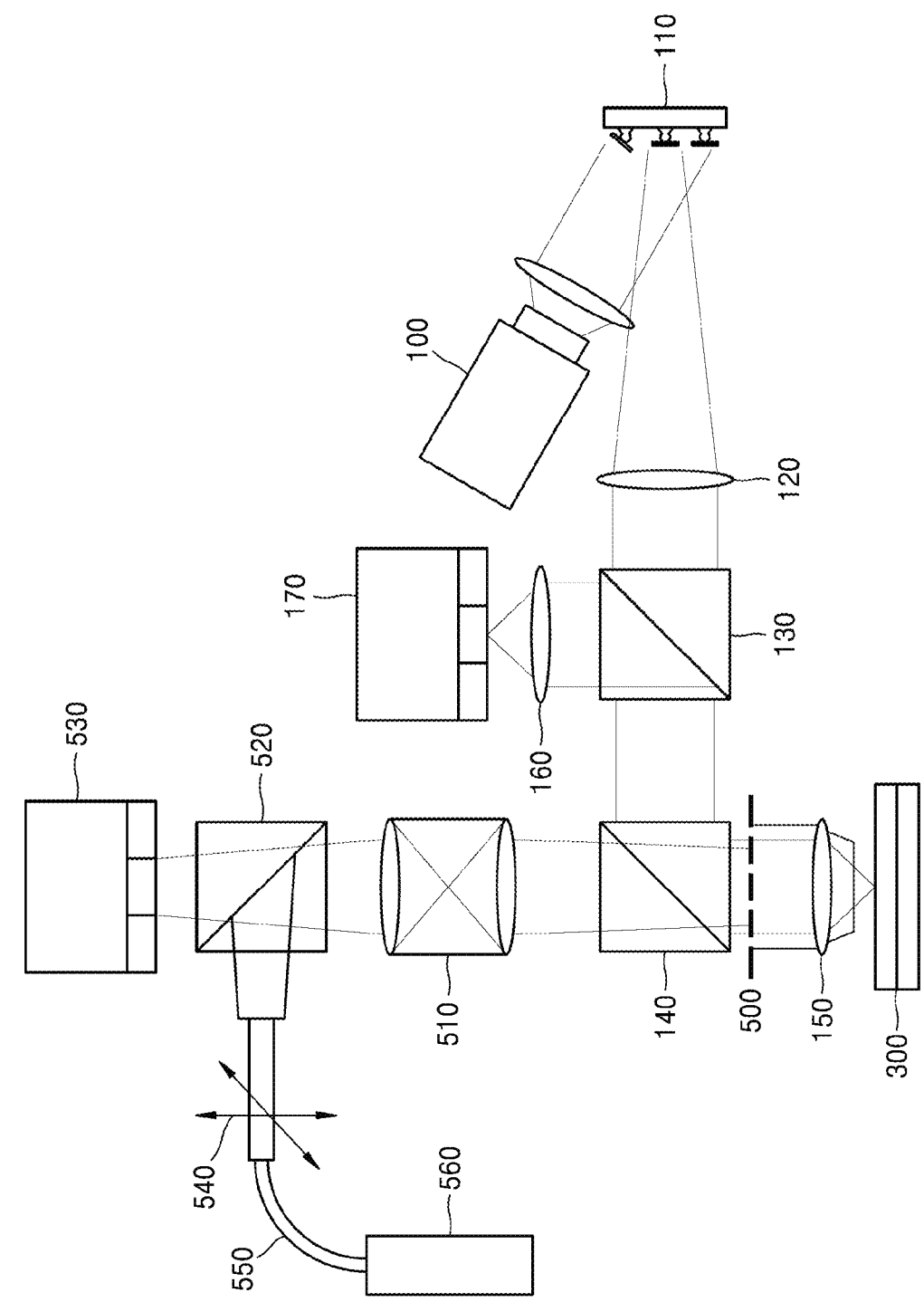
FIG. 7 is a configuration diagram of a system for measuring the thickness and properties of a thin film using a spatial light modulator according to the first embodiment of the inventive concept.
Figure 8:
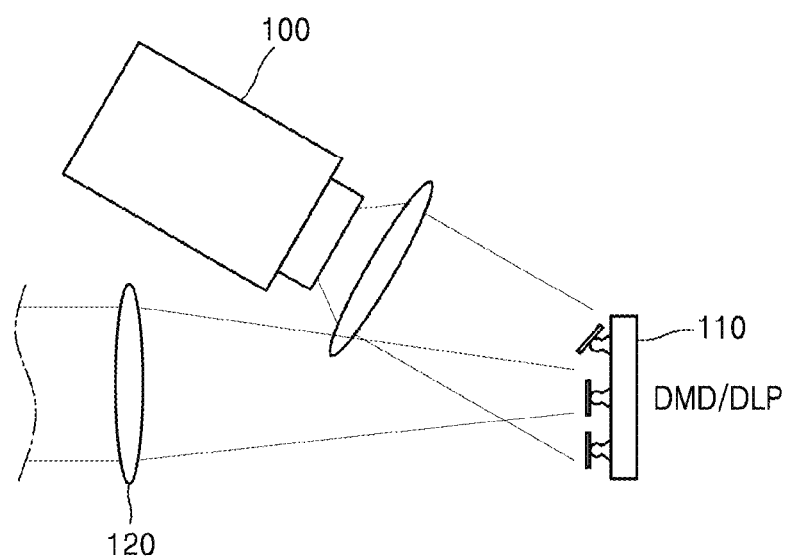
FIGS. 8 to 10 are diagrams illustrating various examples of a spatial light modulator.
Figure 9:
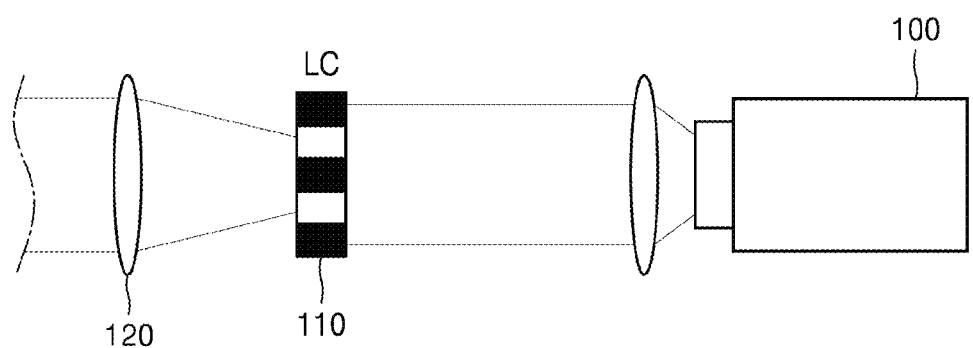
Figure 10:
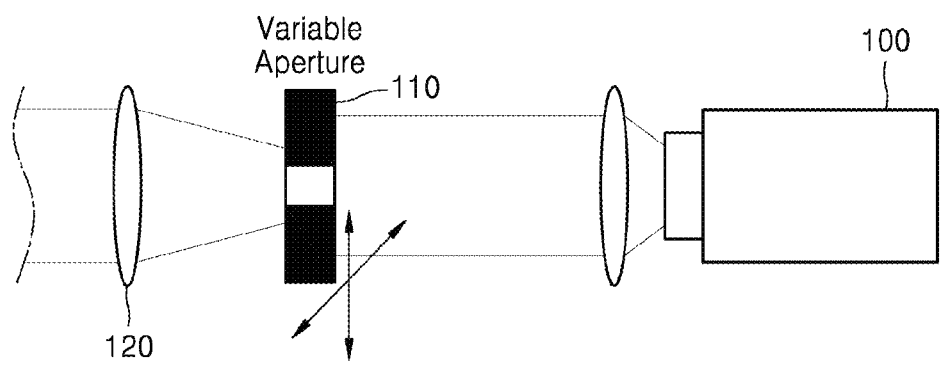
Figure 11:
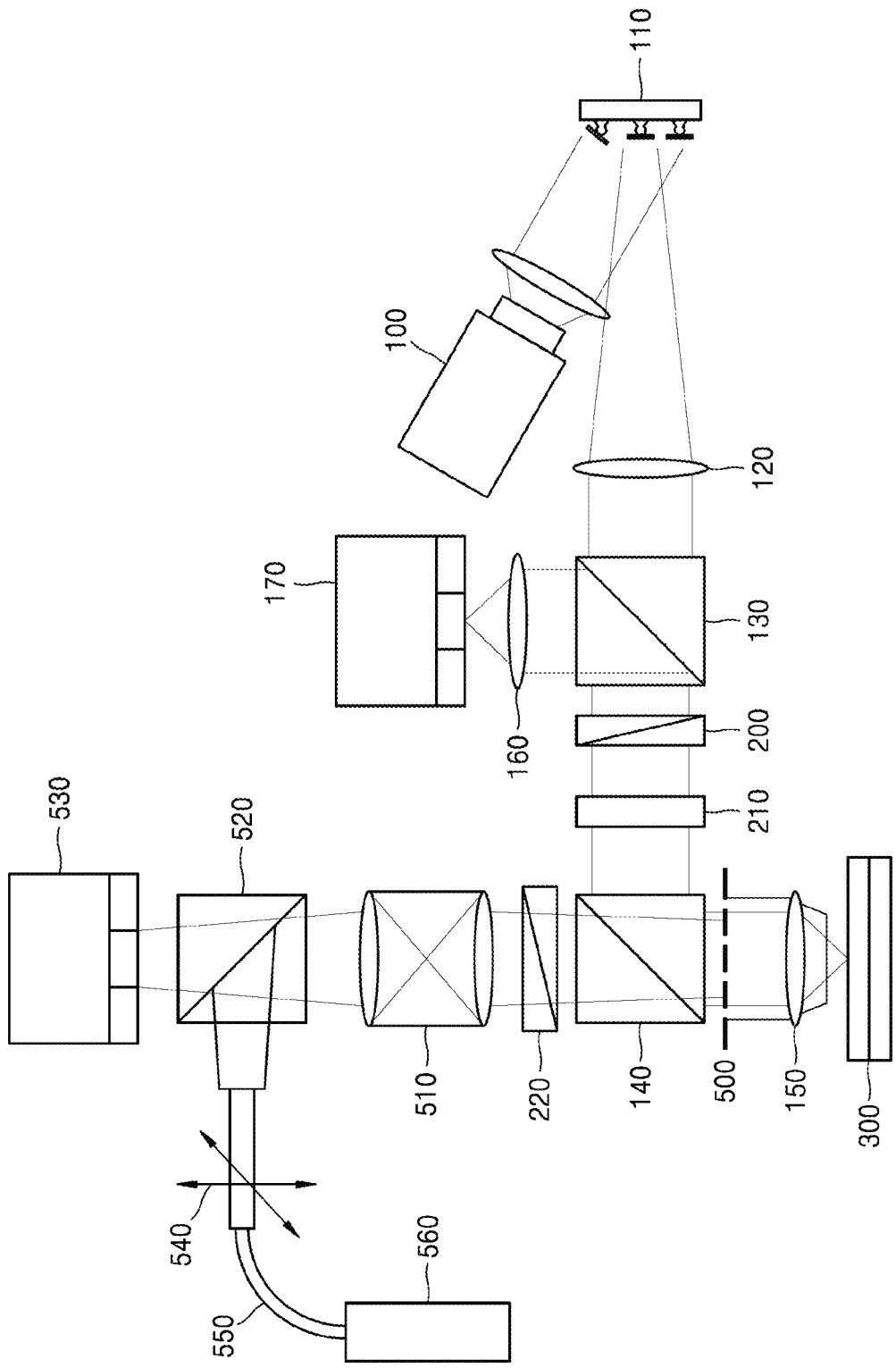
FIG. 11 is a configuration diagram of a system for measuring the thickness and properties of a thin film using a spatial light modulator according to a second embodiment of the inventive concept.
Figure 12:
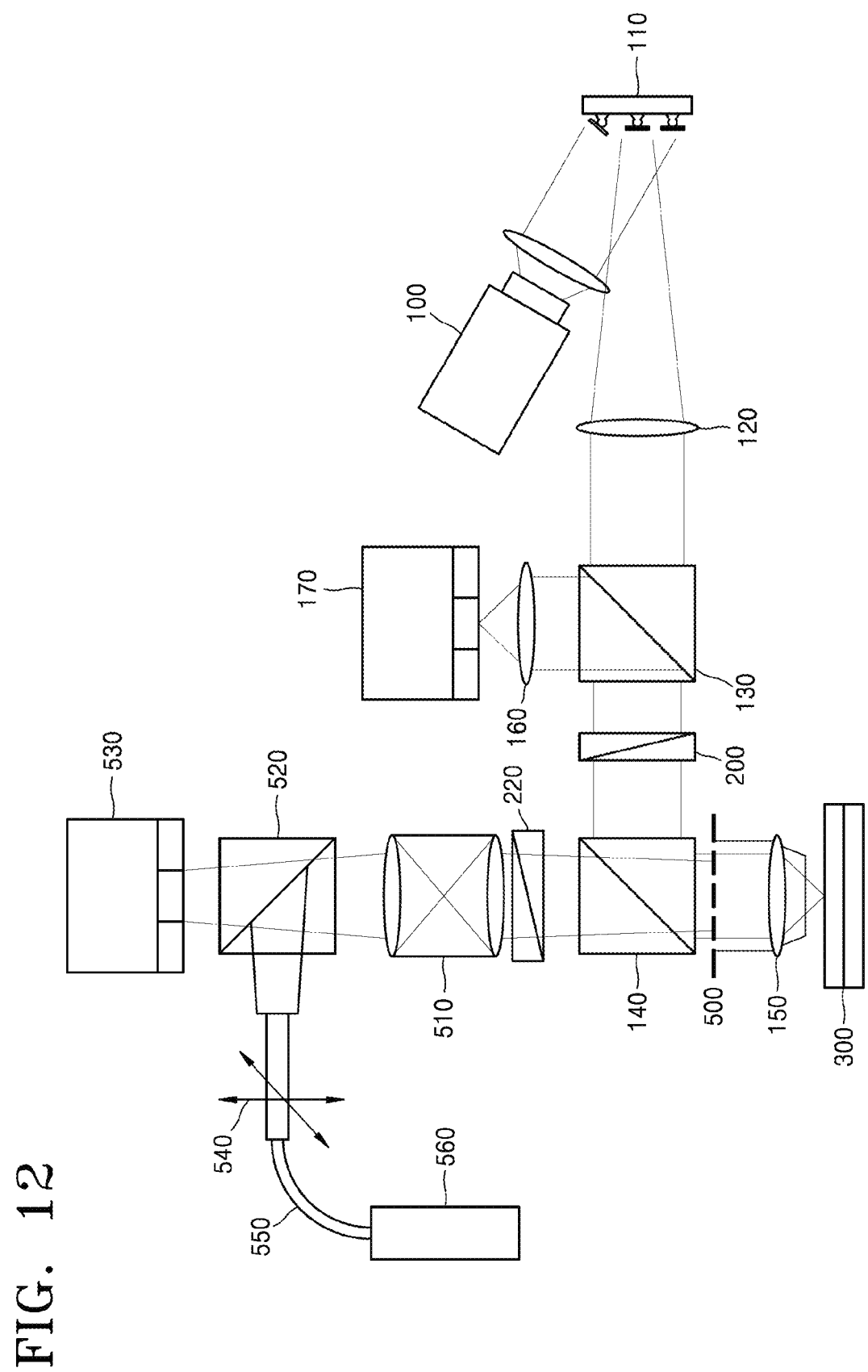
FIG. 12 is a configuration diagram of a system for measuring the thickness and properties of a thin film using a spatial light modulator according to a third embodiment of the inventive concept.
Figure 13:
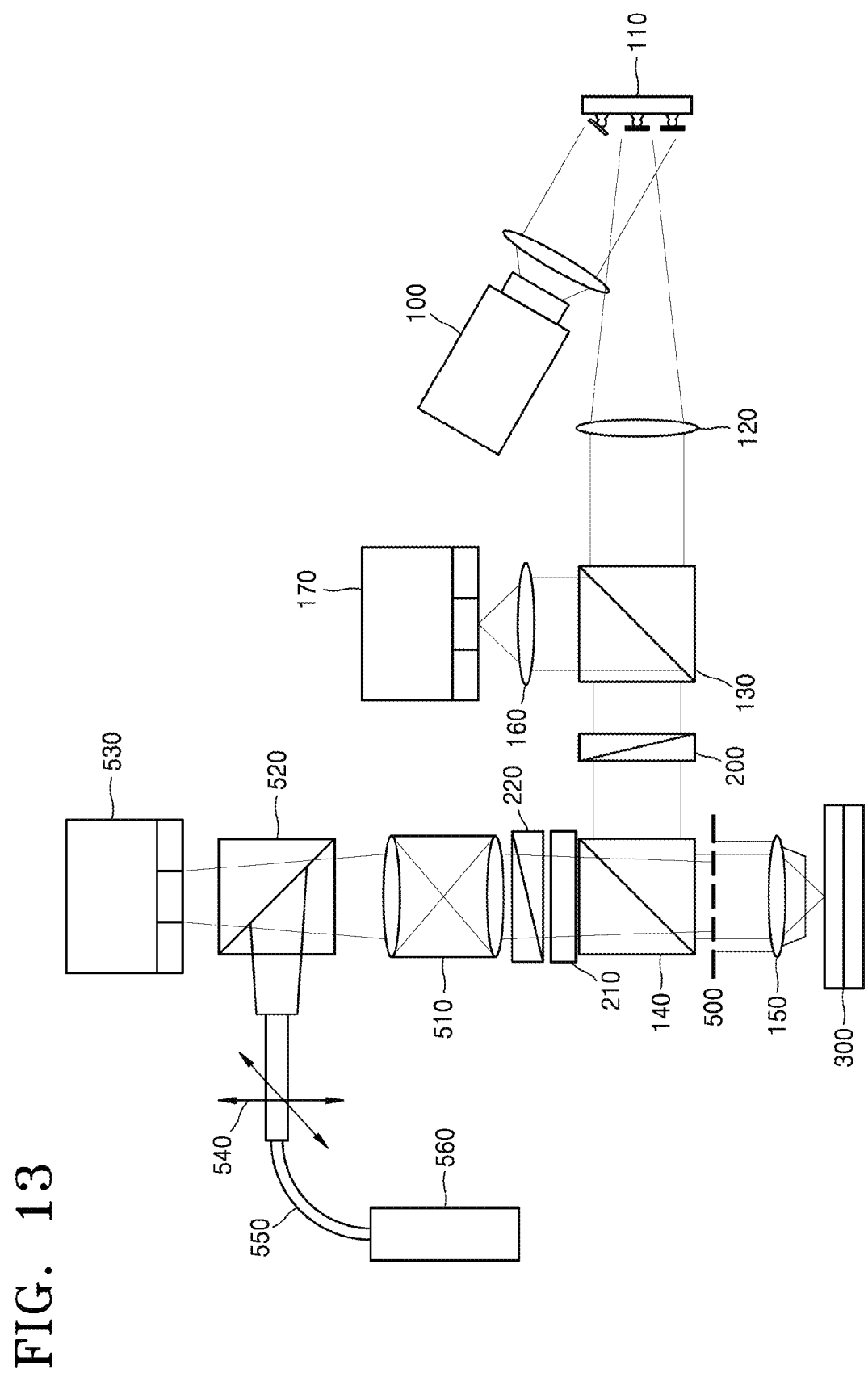
FIG. 13 is a configuration diagram of a system for measuring the thickness and properties of a thin film using a spatial light modulator according to a fourth embodiment of the inventive concept.
Figure 14:
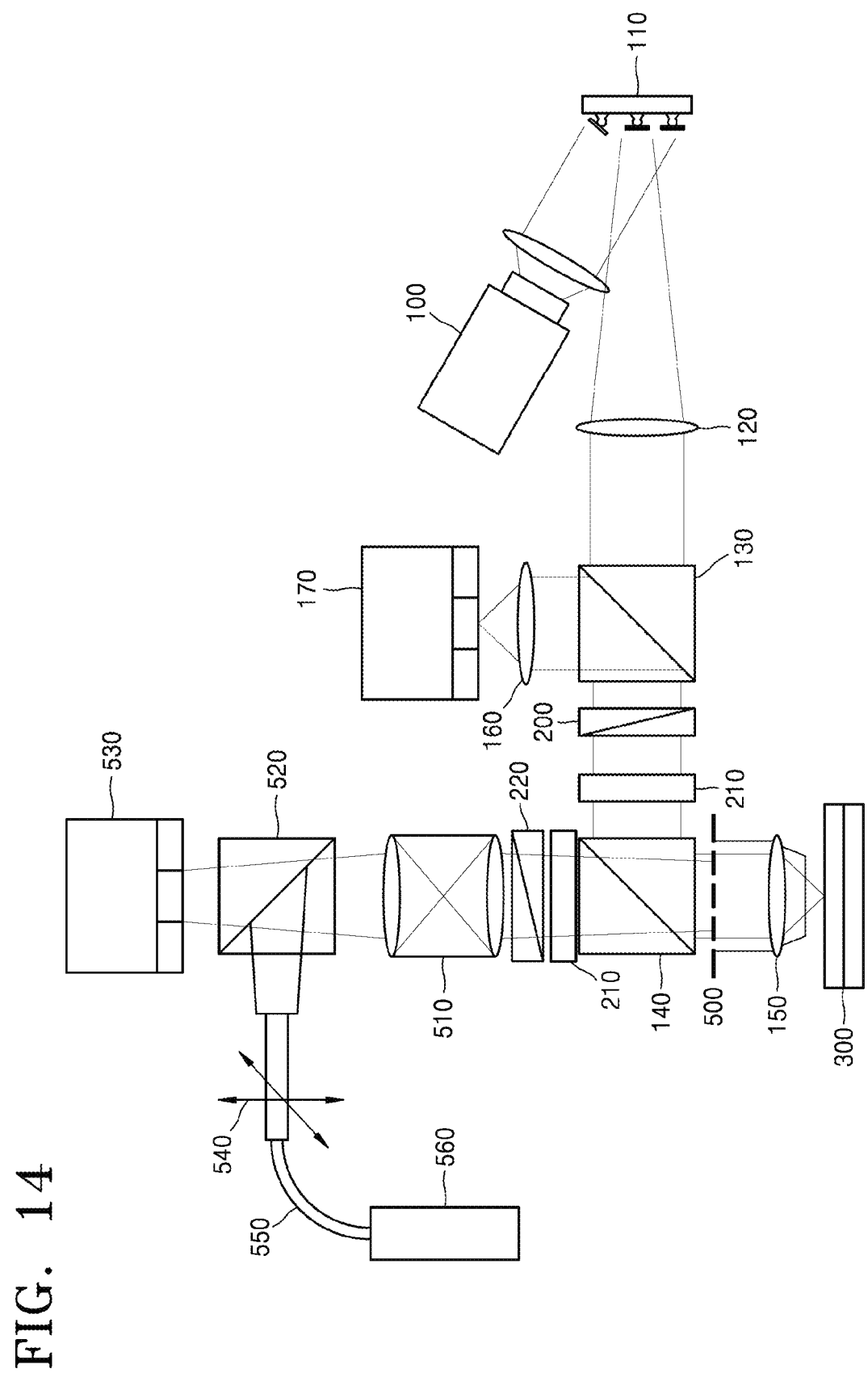
FIG. 14 is a configuration diagram of a system for measuring the thickness and properties of a thin film using a spatial light modulator according to a fifth embodiment of the inventive concept.
Figure 15:
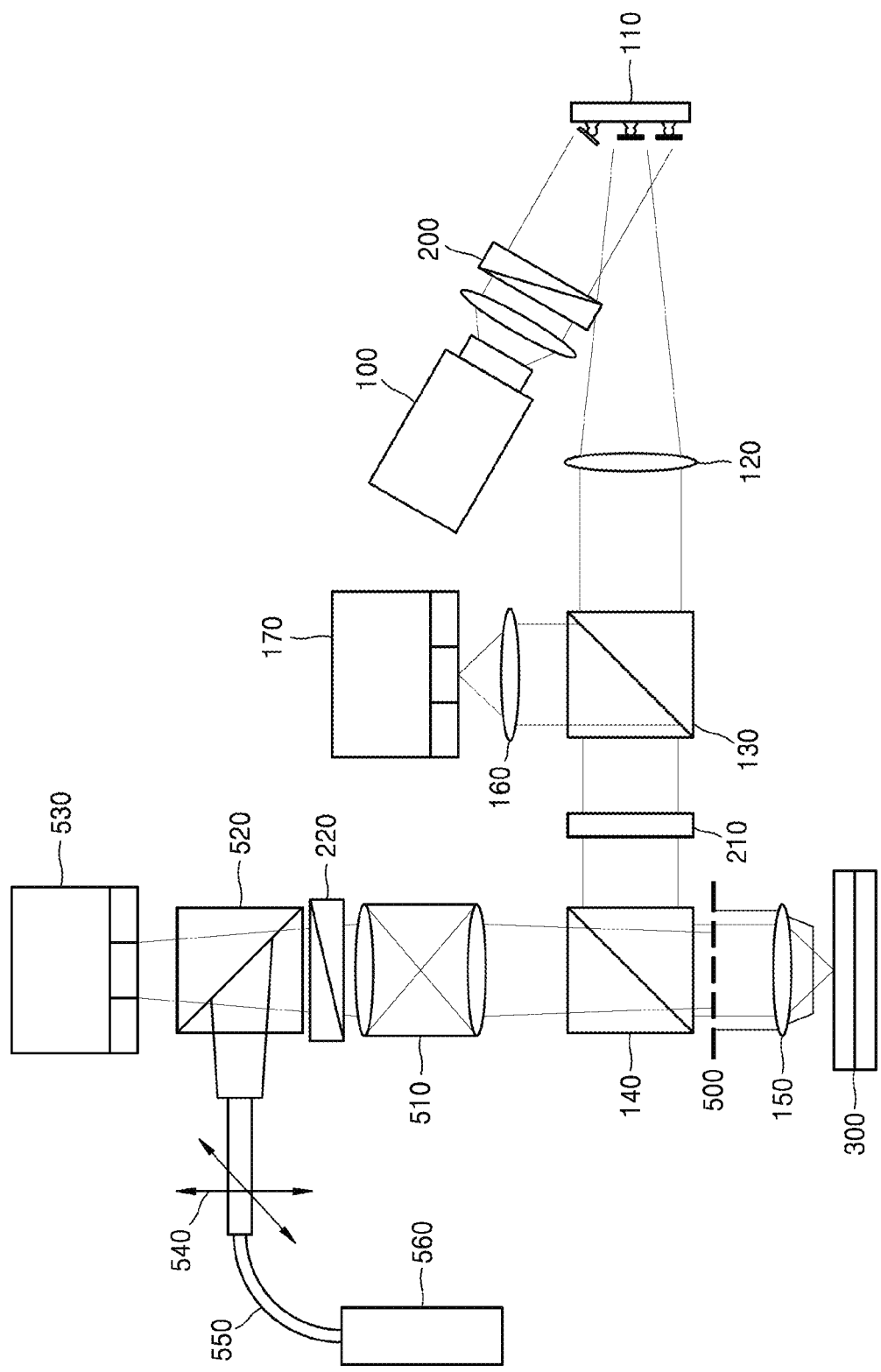
FIG. 15 is a block diagram of a system for measuring the thickness and properties of a thin film using a spatial light modulator according to a sixth embodiment of the inventive concept.
Figure 16:
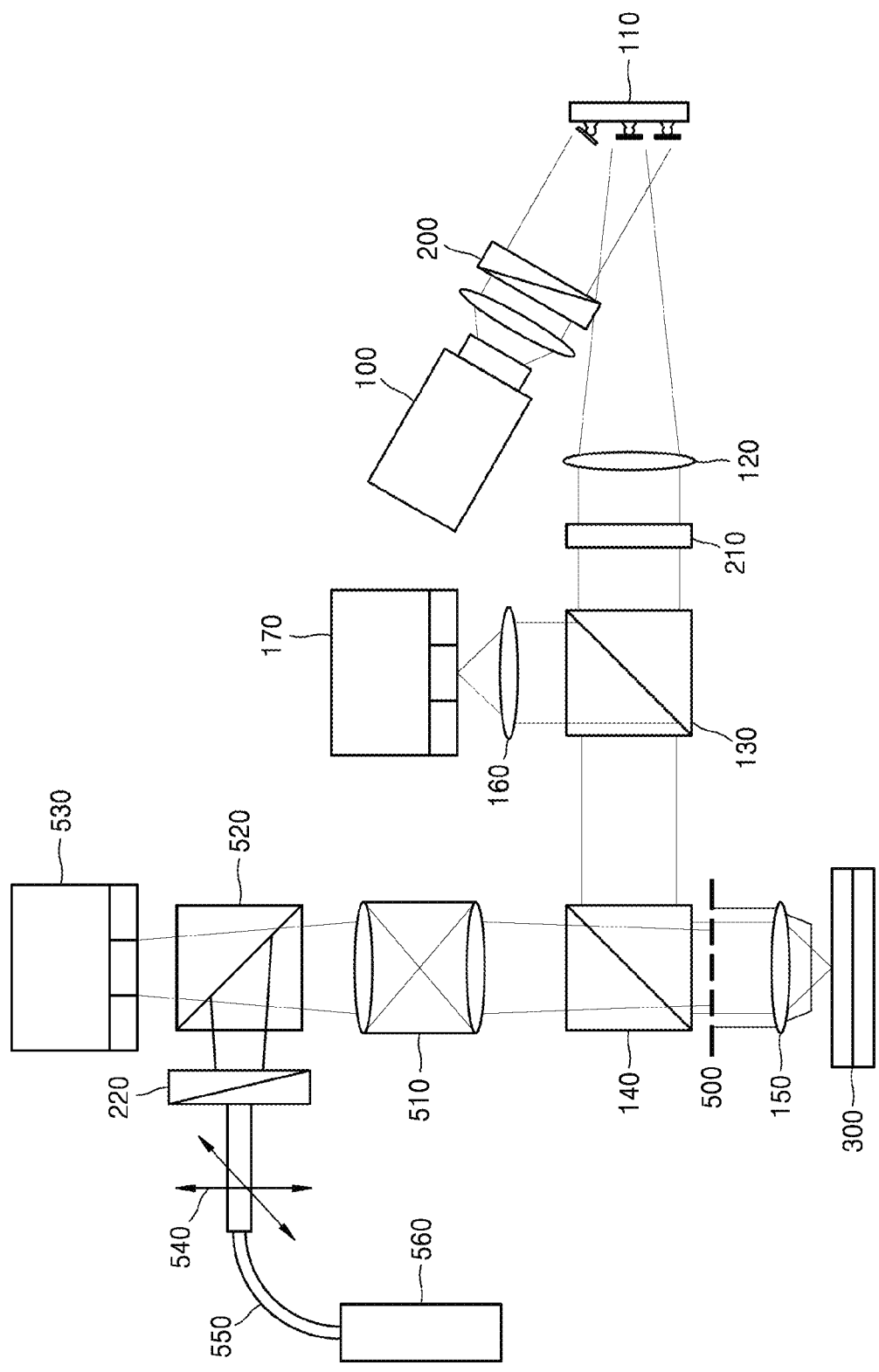
FIG. 16 is a configuration diagram of a system for measuring the thickness and properties of a thin film using a spatial light modulator according to a seventh embodiment of the inventive concept.
Figure 17:
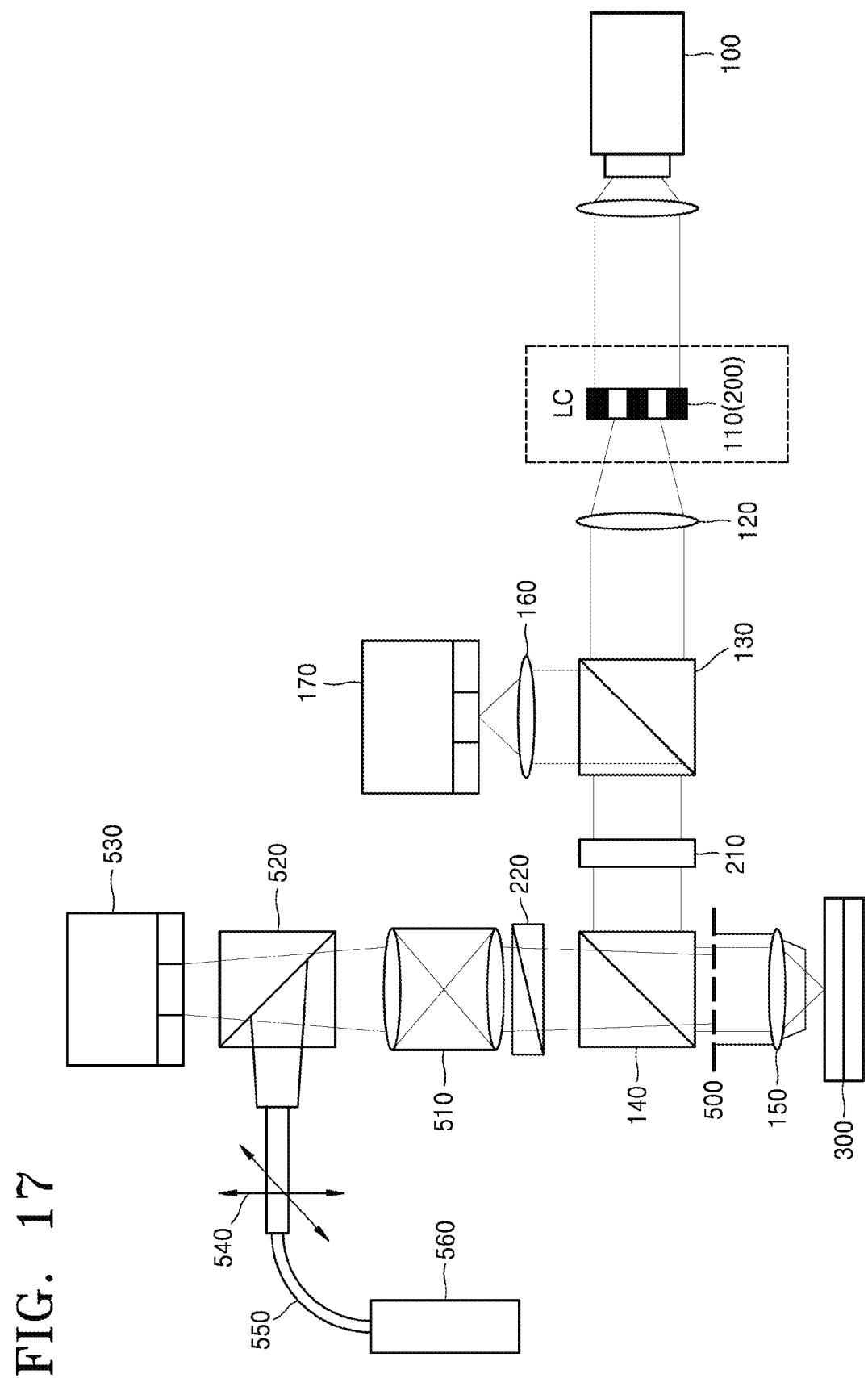
FIG. 17 is a configuration diagram of a system for measuring the thickness and properties of a thin film using a spatial light modulator according to an eighth embodiment of the inventive concept.
Figure 18:
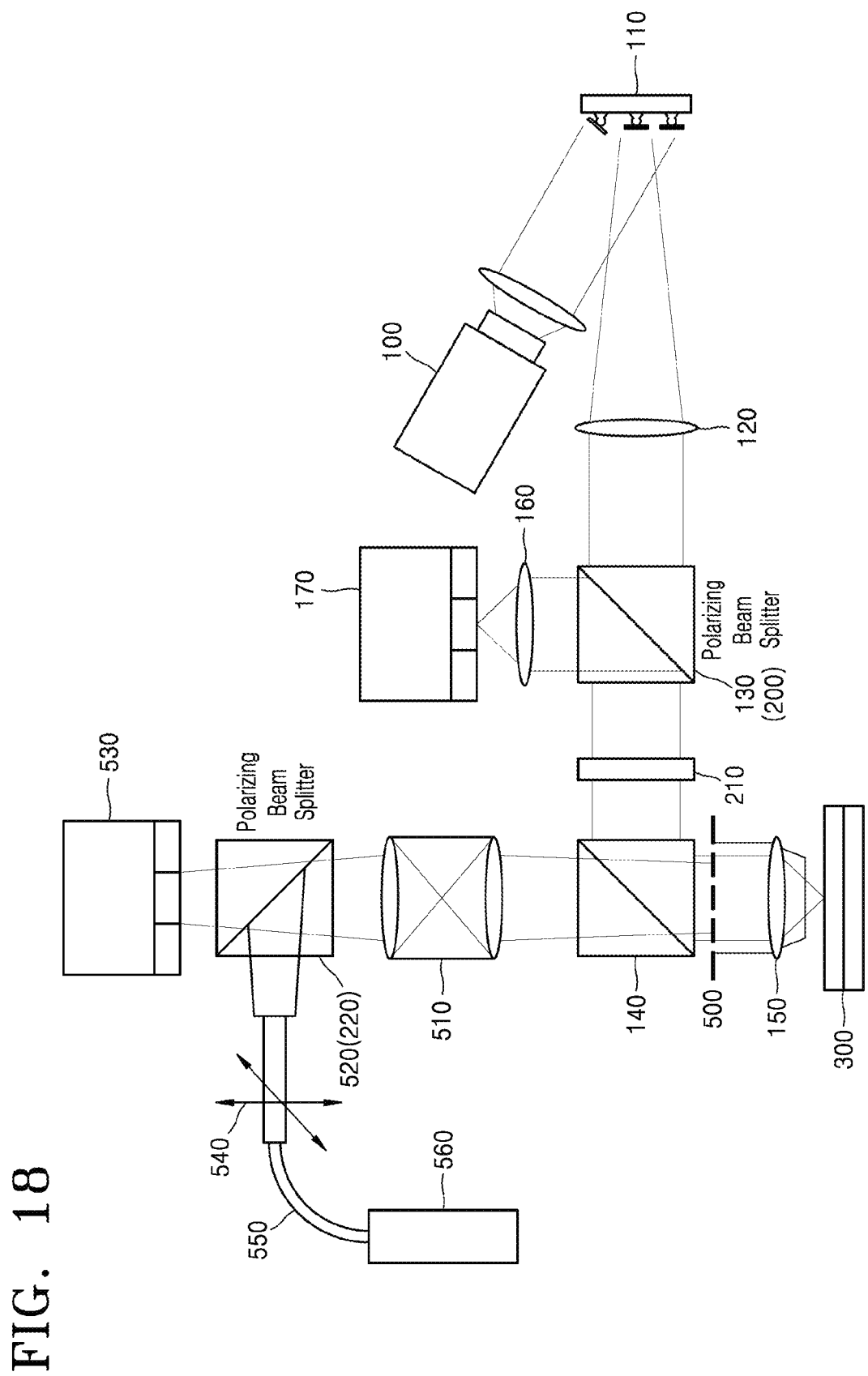
FIG. 18 is a block diagram of a system for measuring the thickness and properties of a thin film using a spatial light modulator according to a ninth embodiment of the inventive concept.
Figure 19:
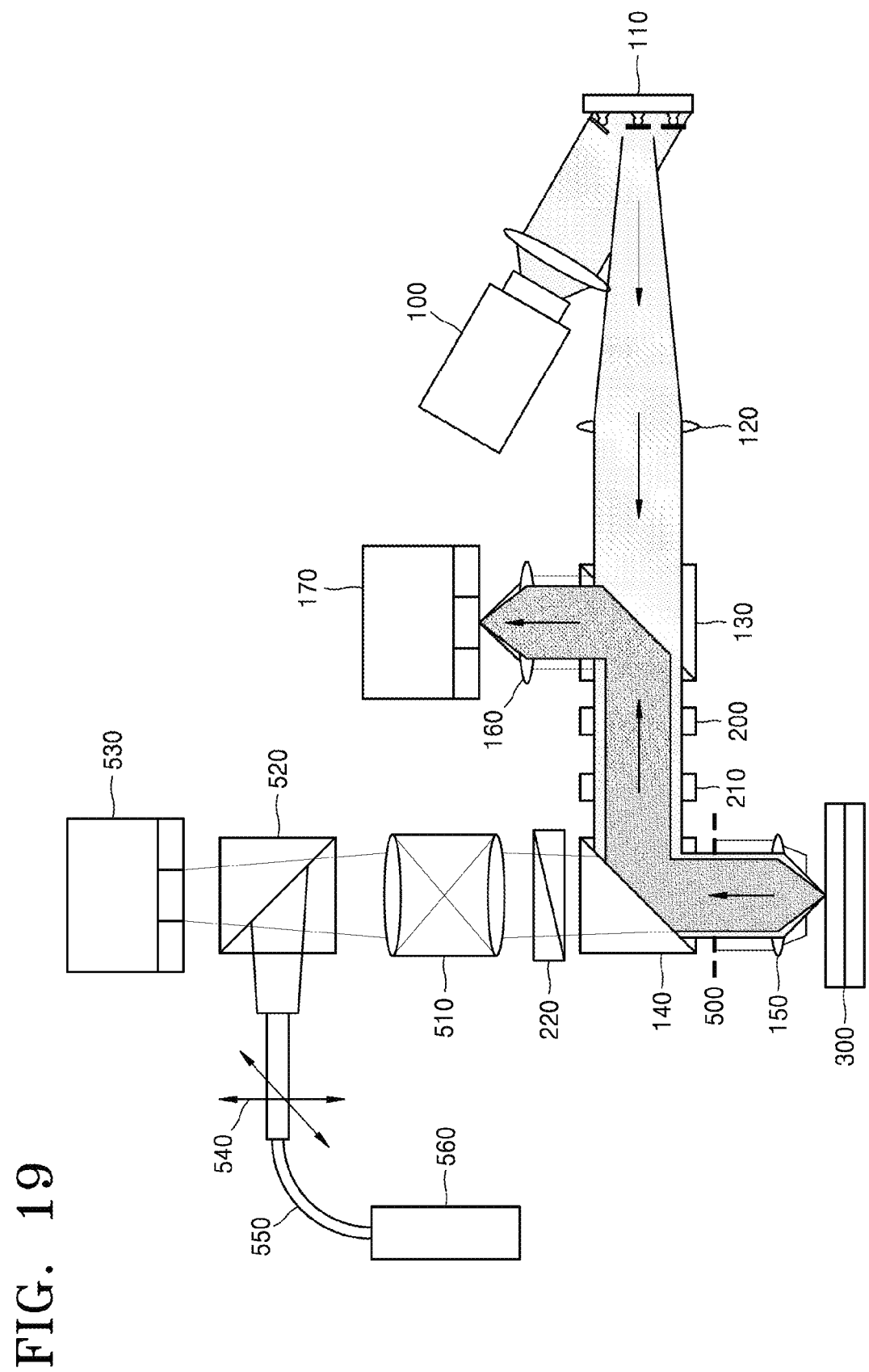
FIG. 19 is a view showing a light path through which an image of spatial light irradiated to a certain area of a sample in FIG. 11 is acquired as an image by the first camera.
Figure 20:
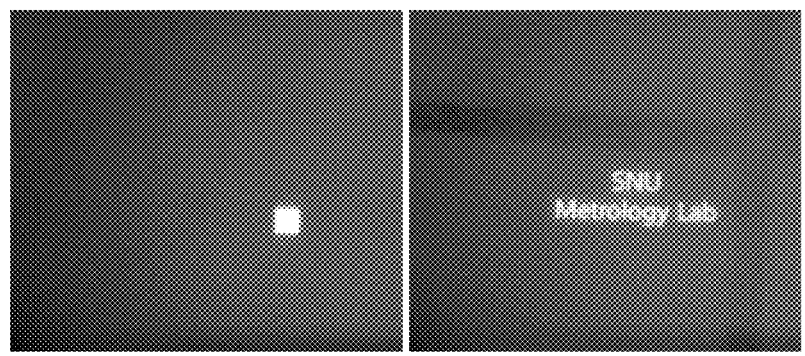
FIG. 20 is a view showing an image of a sample obtained by the first camera according to FIG. 19.
Figure 21:
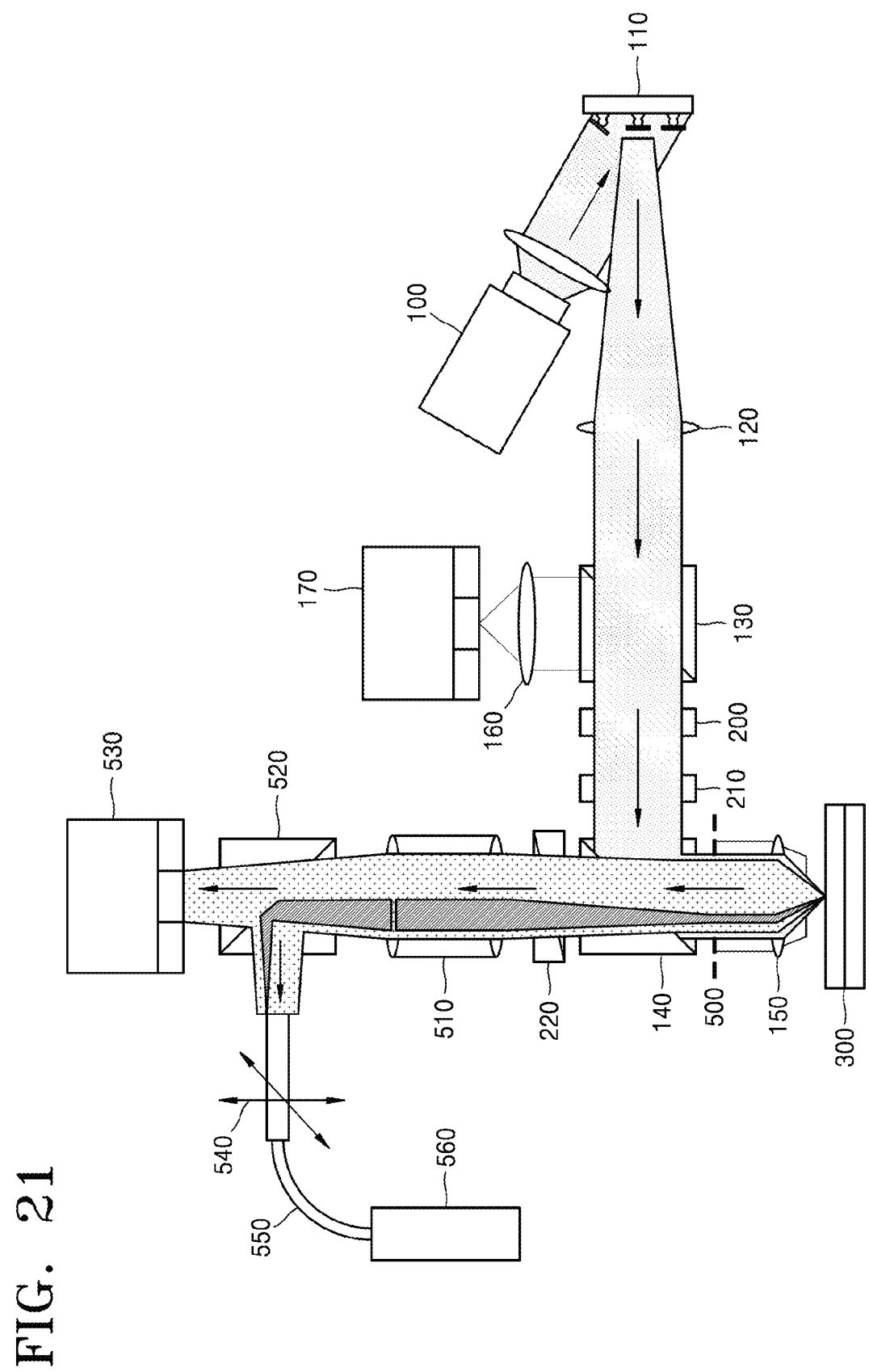
FIG. 21 is a view showing a light path through which the reflected light of spatial light irradiated to the certain area of the sample in FIG. 11 is transmitted to the second camera and the spectrometer in the image formed on the back focal plane of the objective lens.
Figure 22:
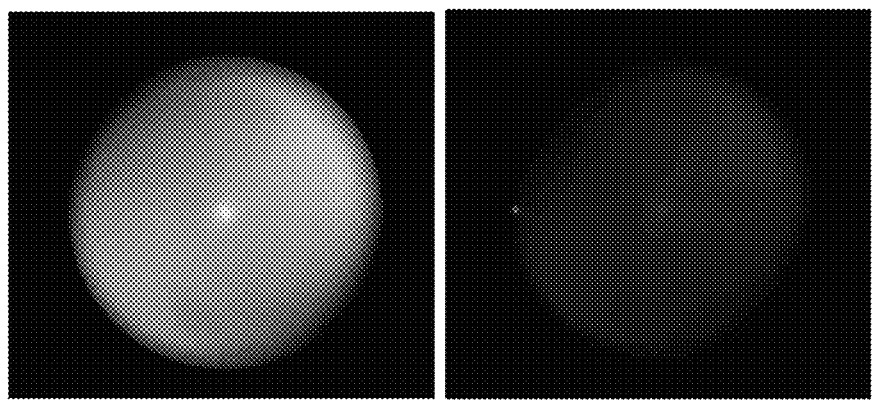
FIG. 22 is a view showing an image of a back focal plane obtained by the second camera according to FIG. 21.
Figure 23:
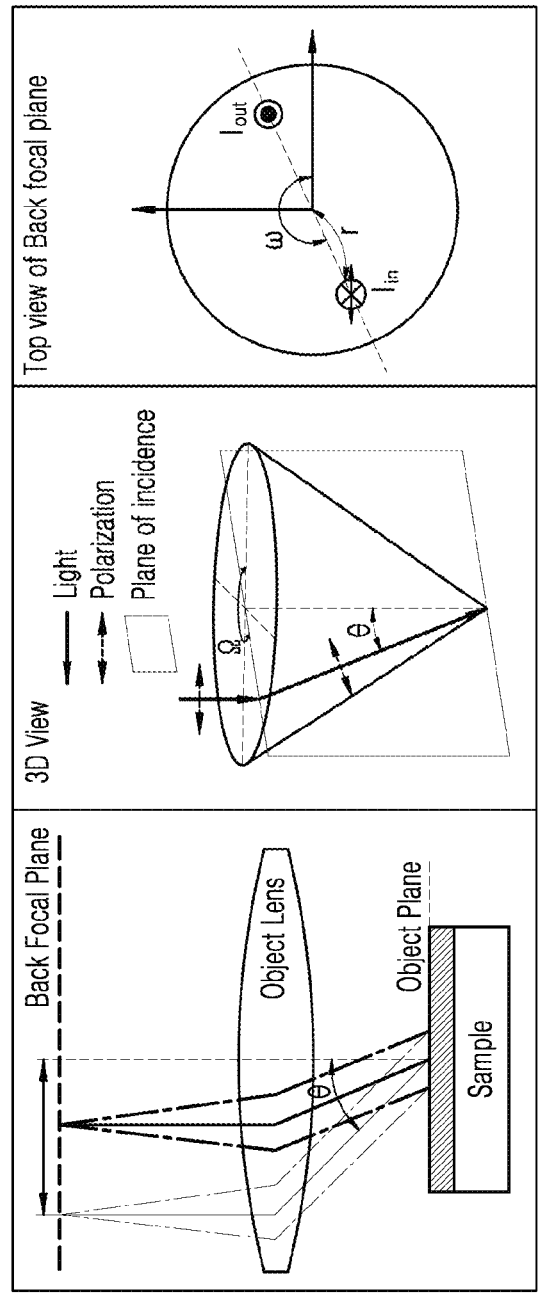
FIG. 23 is a diagram geometrically showing the relationship between the position of the focal point in the back focal plane and the angle of incidence in the system shown in FIG. 11.
Figure 24:
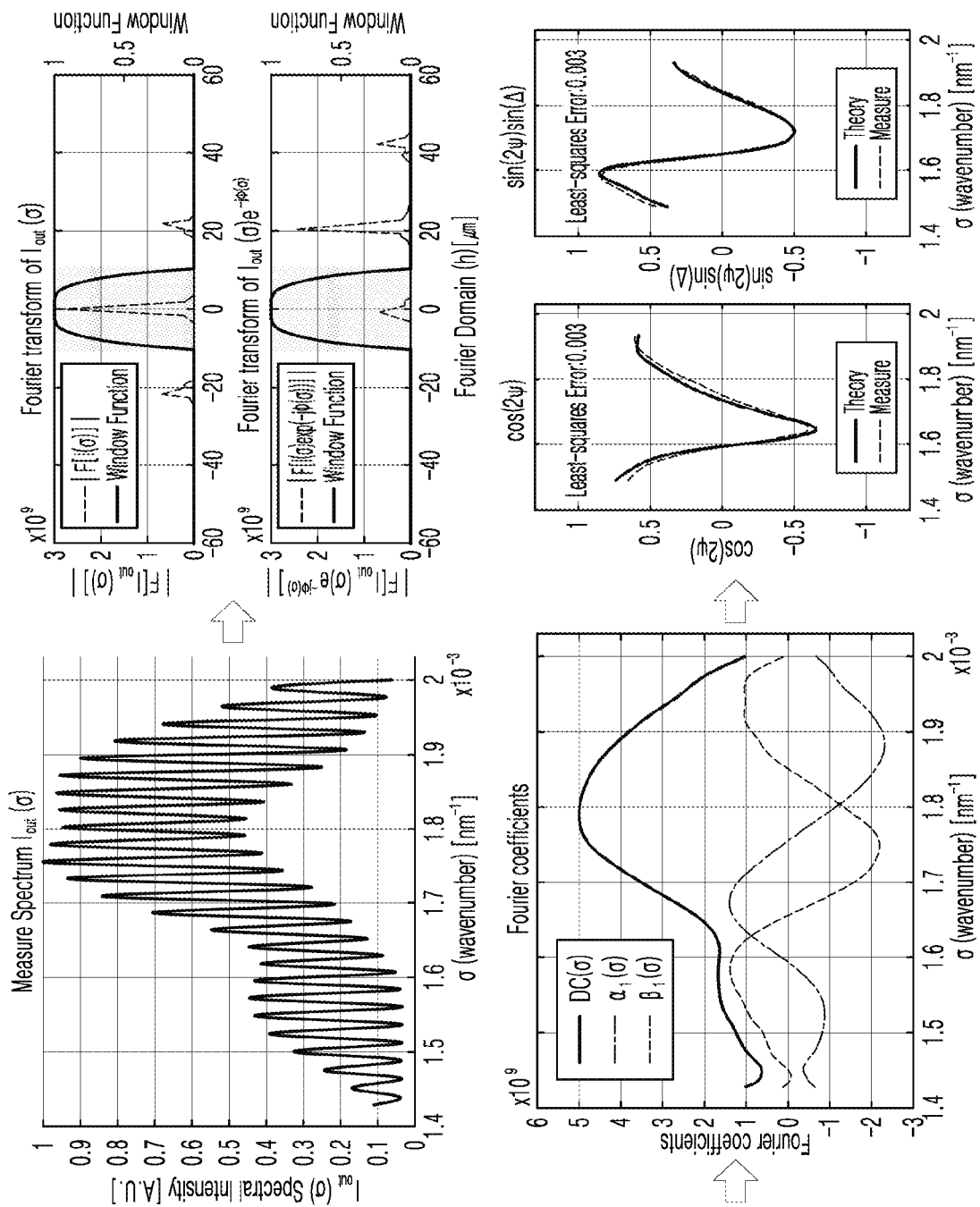
FIG. 24 is a graph sequentially showing a measurement spectrum of a 900 nm thick $SiO_2$/Si sample, a Fourier transform of the spectral spectrum, a Fourier coefficient restoration, a spectral ellipsometry signal restoration, and a thickness measurement process through comparison with a theoretical value.
Figure 25:
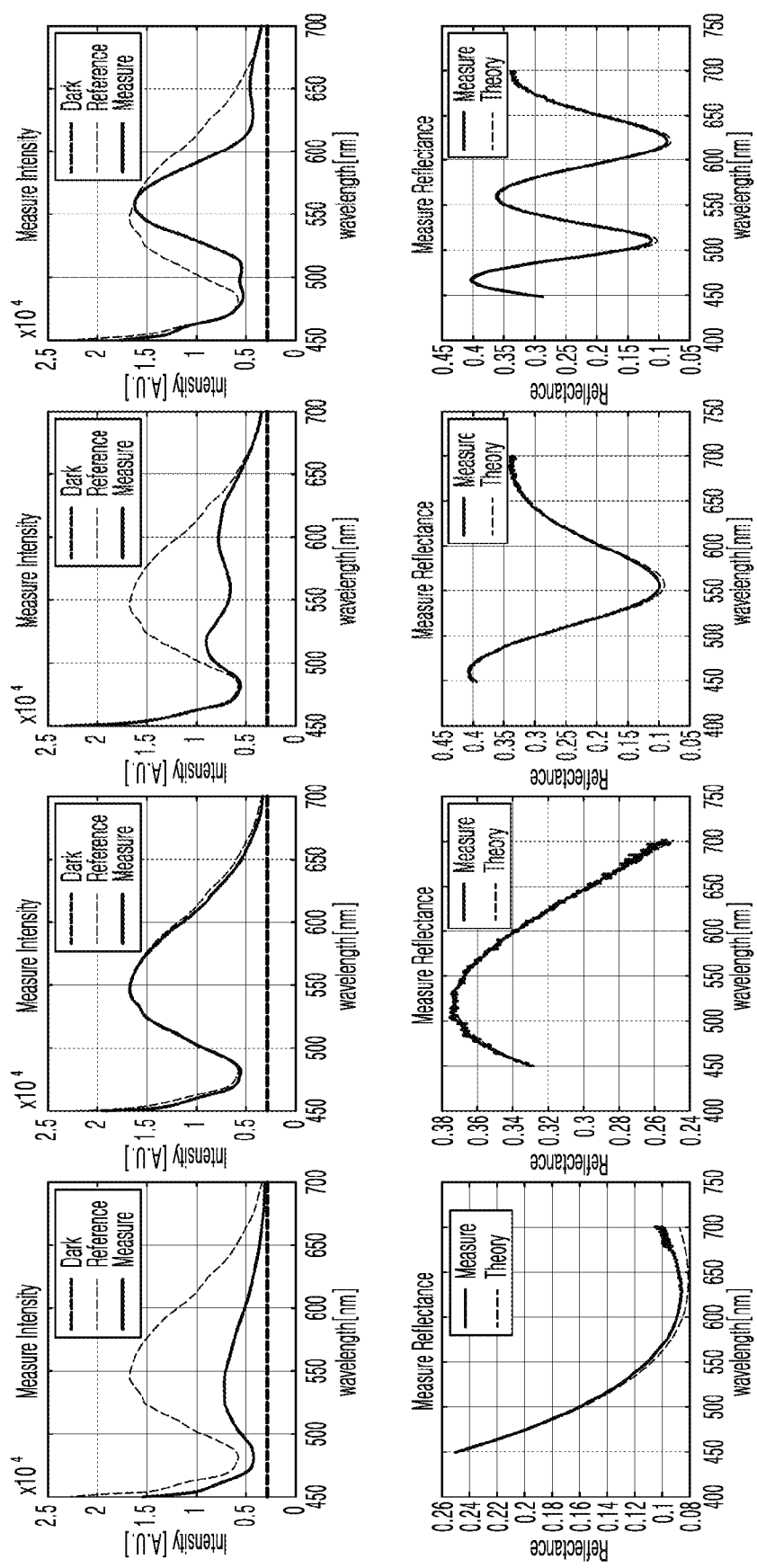
FIG. 25 is a graph showing measured spectral spectra (top) and calculated reflectivity and theoretical reflectivity modeling results (bottom) of $SiO_2$/Si samples having four thicknesses.
Figure 26:
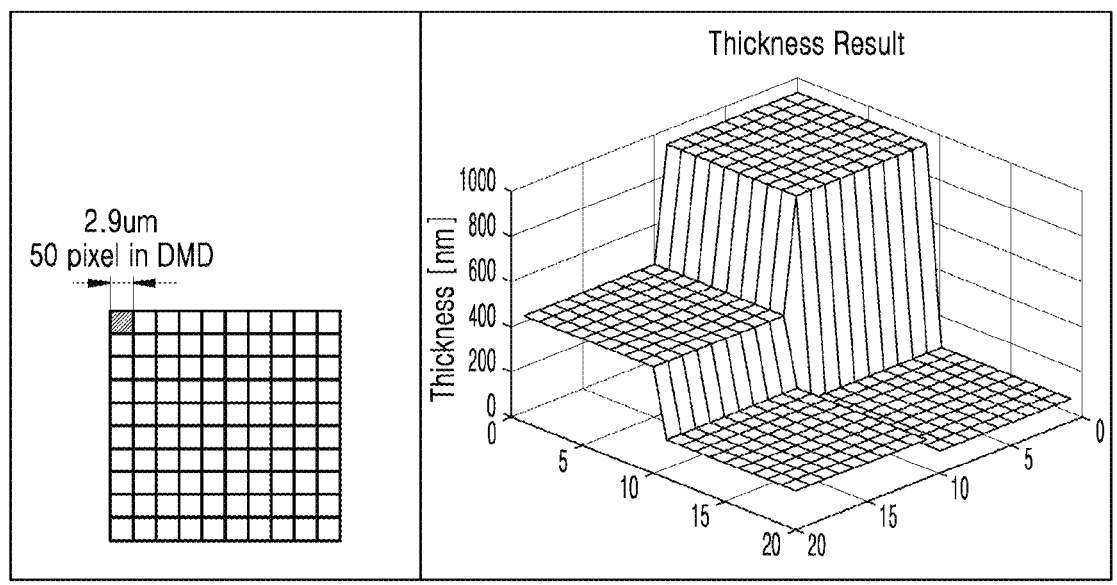
FIG. 26 is a diagram showing an example of a region grid scan using a spatial light modulator (left) and a result of measuring four thin film thickness regions (right)
Figure 27:
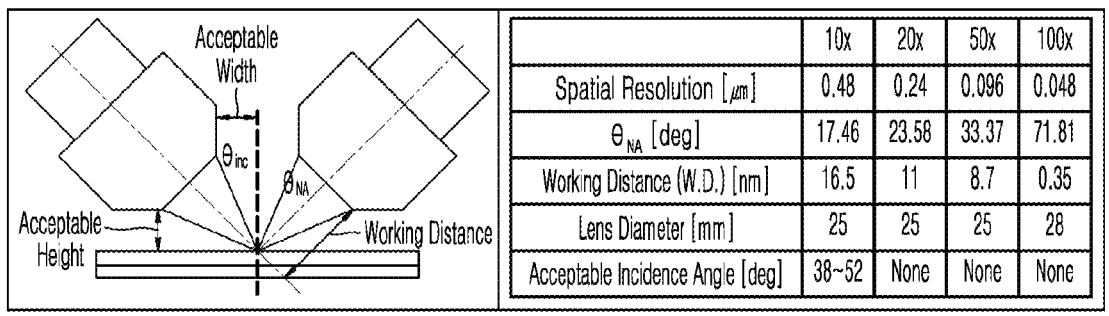
FIG. 27 is data showing the magnification limit of an objective lens in an inclined incident reflection structure.
Figure 28:
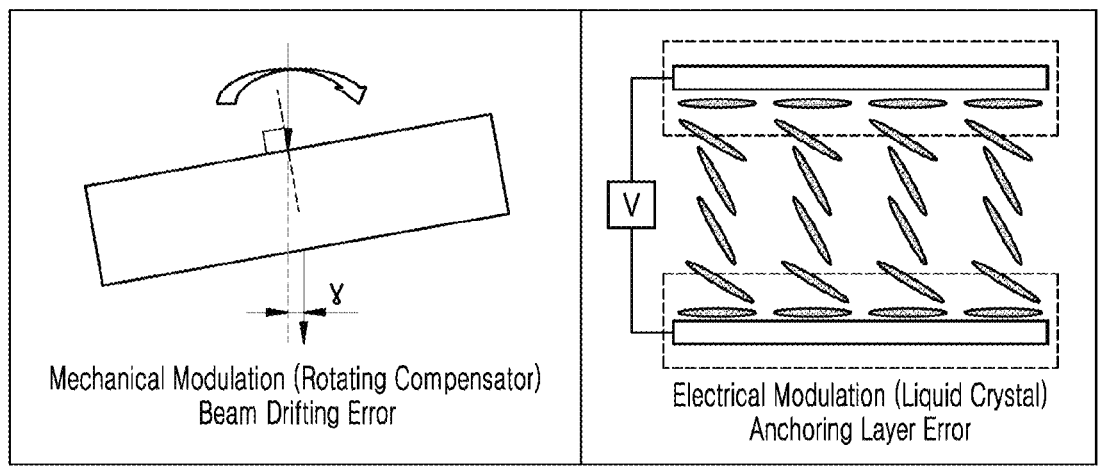
FIG. 28 is a diagram schematically illustrating a measurement error factor due to driving of a polarization modulator.

FIG. 7 is a configuration diagram of a system for measuring the thickness and properties of a thin film using a spatial light modulator according to the first embodiment of the inventive concept. FIGS. 8 to 10 are diagrams illustrating various examples of a spatial light modulator. FIG. 11 is a configuration diagram of a system for measuring the thickness and properties of a thin film using a spatial light modulator according to the second embodiment of the inventive concept. FIG. 12 is a configuration diagram of a system for measuring the thickness and properties of a thin film using a spatial light modulator according to the third embodiment of the inventive concept. FIG. 13 is a configuration diagram of a system for measuring the thickness and properties of a thin film using a spatial light modulator according to the fourth embodiment of the inventive concept. FIG. 14 is a configuration diagram of a system for measuring the thickness and properties of a thin film using a spatial light modulator according to the fifth embodiment of the inventive concept. FIG. 15 is a configuration diagram of a system for measuring the thickness and properties of a thin film using a spatial light modulator according to the sixth embodiment of the inventive concept. FIG. 16 is a configuration diagram of a system for measuring the thickness and properties of a thin film using a spatial light modulator according to the seventh embodiment of the inventive concept. FIG. 17 is a configuration diagram of a system for measuring the thickness and properties of a thin film using a spatial light modulator according to the eighth embodiment of the inventive concept. FIG. 18 is a configuration diagram of a system for measuring the thickness and properties of a thin film using a spatial light modulator according to the ninth embodiment of the inventive concept. FIG. 19 is a view showing a light path through which an image of spatial light irradiated to a certain area of a sample in FIG. 11 is acquired as an image by the first camera. FIG. 20 is a view showing an image of a sample obtained by the first camera according to FIG. 19. FIG. 21 is a view showing a light path through which the reflected light of spatial light irradiated to the certain area of the sample in FIG. 11 is transmitted to the second camera and the spectrometer in the image formed on the back focal plane of the objective lens. FIG. 22 is a view showing an image of a back focal plane obtained by the second camera according to FIG. 21. FIG. 23 is a diagram geometrically showing the relationship between the position of the focal point in the back focal plane and the angle of incidence in the system shown in FIG. 11. FIG. 24 is a graph sequentially showing a measurement spectrum of a 900 nm thick $SiO_2$/Si sample, a Fourier transform of a spectral spectrum, a Fourier coefficient restoration, a spectral ellipsometry signal restoration, and a thickness measurement process through comparison with a theoretical value. FIG. 25 is a graph showing the measurement spectrum (top) and the calculated reflectivity and theoretical reflectivity modeling results (bottom) of the $SiO_2$/Si sample of four thicknesses. FIG. 26 is a diagram showing an example of a region grid scan using a spatial light modulator (left) and a result of measuring four thin film thickness regions (right). FIG. 27 is data showing the magnification limit of an objective lens in an inclined incident reflection structure. FIG. 28 is a diagram schematically illustrating a measurement error factor due to driving of a polarization modulator.

The system for measuring the thickness and properties of a thin film using a spatial light modulator according to the first embodiment of the inventive concept shown in FIG. 7 includes a light source 100, a spatial light modulator 110, a first beam splitter 140, an objective lens 150, a second beam splitter 130, a first camera 170, an optical fiber 550, a spectrometer 560, a third beam splitter 520, and a second camera 530.

The light source 100 is a light emitting source that generates incident light. The light source 100 is a component that generates and emits incident light. As the light source 100, various known light sources may be employed. The light source 100 is a part that generates light that is a source of incident light of the optical system, and light of a single wavelength or light having a certain range of spectrum may be generated and used. For example, as the light source 100, various light sources having a known intensity and wavelength, such as a light emitting diode (LED) or a laser, may be used.

The spatial light modulator 110 is a device for spatially modulating the light emitted from the light source 100 to irradiate only a certain area of the sample. That is, the spatial light modulator 110 is a device that modulates light in space to create a desired image. More specifically, the spatial light modulator 110 allows a certain part to pass light with respect to a given beam of light-cross-section, and a certain part does not allow light to pass through, such that the input light is output in a state that the user wants. In the present specification, a portion that is the minimum unit through which light passes or does not pass is defined as a pixel, and a state in which light passes through each pixel is referred to as on, and a state in which light does not pass is referred to as off.

When viewed from the outside, the spatial light modulator 110 may look like a surface light source or a display in which pixels are arranged in a constant array. In this case, the pixels may have an arbitrary arrangement, for example, in the form of a two-dimensional rectangular array. In this case, each pixel may correspond to coordinates of a Cartesian coordinate system. Alternatively, the pixels may be in the form of a two-dimensional circular array. In this case, each pixel may correspond to the coordinates of the polar coordinate system. The inventive concept is not limited to a certain arrangement method of each pixel of the spatial light modulator or a method for turning on/off the pixel, that is, a certain driving method.

The spatial light modulator 110 is not limited to a certain implementation method and may be understood to refer to a device that generates and outputs a user-desired image with respect to input light. The user may adjust the on/off of each pixel by using a control module (not shown in the drawing) connected to the spatial light coordinate device, thereby drawing a desired image as specified in advance.

The light modulated by the spatial light modulator 110 passes through the second optical system 120 which is an optional component. The second optical system 120, for example, a known relay lens (relay lens), may be employed, and may prevent the beam diameter on the light path from becoming too wide and limit the beam within a certain range.

The spatial light modulator 110 may include any one of a Digital Mirror Device (DMD), Digital Light Processing (DLP), Liquid Crystal (LC) array, Liquid Cell on Silicon (LCoS), and Variable Aperture.

As shown in FIG. 8, the digital micromirror device is a micro-sized mirror manufactured by a known micro electro-mechanical system (MEMS). That is, in the digital light projector, each digital micromirror device serves as a pixel. By applying or not applying an electric signal using an electric circuit connected to the lower electrode of each digital micromirror device, it is possible to turn on/off the light of each digital micromirror device. Since each pixel of a digital light projector (DLP), which is a known device, may be turned on/off by a signal from the outside using, for example, a computer, it is possible to create light sources with any shape you want, such as circles, rectangles, or even text or pictures and by controlling this signal at a constant refresh rate based on predetermined data, a light source corresponding to a moving image may be created.

As shown in FIG. 9, the LC-type spatial light modulator 110, which is a known device, is similar to a digital light projector (DLP) in that individual elements are arranged in an array, but has a difference in that the individual devices are LC or LCoS elements rather than digital micromirror devices. That is, in the spatial light modulator 110 of the LCoS method, the LCoS element serves as a pixel. The LCoS element is substantially similar to a single element of a known liquid crystal display (LCD) in terms of its structure, but is slightly different in that it is formed on a silicon substrate instead of a glass substrate.

As shown in FIG. 10, the variable aperture is a typical analog device and may allow light from the light source 100 to pass through a desired shape of light at a desired location by variably adjusting the open area and position of the variable aperture. The position of the variable aperture may be adjusted by employing a known transfer device such as a micrometer stage.

The first beam splitter 140 is a component that changes the direction of the light modulated by the spatial light modulator 110, and allows a part of the reflected light reflected from the sample to pass. The first beam splitter 140 transmits the light passing through the spatial light modulator 110 and the second optical system 120 to the objective lens 150. The first beam splitter 140 may be a beam splitter having a known structure.

The objective lens 150 is an optical component for condensing the light refracted by the first beam splitter 140 to a certain area of the sample. The objective lens 150 may be, for example, a convex lens. The objective lens 150 may employ lenses of various magnifications. The objective lens 150 may focus light so as to irradiate light in the form of a spot only to a certain portion of the sample 300. The second beam splitter 130 is disposed on an incident light path between the spatial light modulator 110 and the first beam splitter 140. The structure of the second beam splitter 130 may be the same as that of the first beam splitter 140. The second beam splitter 130 serves to pass the light without changing the path of the incident light while the light is incident from the spatial light modulator 110 to the first beam splitter 140. In the second beam splitter 130, a part of the reflected light reflected from the sample 300 is refracted and separated by the first beam splitter 140, and then is acquired as an image of the sample 300 by a first camera 170, which will be described later. A third optical system 160 is disposed on an optical path between the second beam splitter 130 and the first camera 170. In the process in which the image of the sample 300 refracted by the second beam splitter 130 is acquired by the lens of the first camera 170, the third optical system 160 may improve the image quality of the image of the sample 300 obtained by the first camera 170 by condensing the light.

The first camera 170 is a device for acquiring a surface image of the sample by the reflected light of the sample 300 incident from the second beam splitter 130. The first camera 170 is not a device for data analysis, but a device for easily observing the surface of the sample 300 with the naked eye, and allows the user to observe whether the incident light in the form of a spot formed by the spatial light modulator 110 and the objective lens 150 is well irradiated to a certain location of the sample.

The optical fiber 550 is provided so that the reflected light reflected from the sample 300 may receive the reflected light passing through a certain area of the back focal plane of the objective lens 150. The light receiving unit of the optical fiber 550 is installed to correspond to a certain position of the back focal plane of the objective lens 150. The light receiving unit of the optical fiber 550 may be installed directly on the back focal plane 500 of the objective lens 150, but in reality, is more preferable to be installed so as to receive the reflected light of a certain position of the back focal plane 500 image transmitted to a predetermined position by the first optical system 510. The cross-sectional area of the light receiving unit of the optical fiber 550 is significantly smaller than the cross-sectional area of the back focal plane 500 so that only the reflected light passing through a certain position of the back focal plane 500 may be received. Since the reflected light passing through the certain area of the back focal plane 500 is generally reflected light of a single wavelength, the light received by the optical fiber 550 becomes reflected light of a single wavelength. The light receiving unit of the optical fiber 550 may be installed to be two-dimensionally movable by the transfer device 540. The transfer device 540 may employ, for example, a micrometer stage. The transfer device 540 moves the light receiving unit of the optical fiber 550 on the plane on which the image of the back focal plane 500 is transmitted as it is such that the reflected light of a certain area of the back focal plane 500 may be selectively received.

The spectrometer 560 is physically connected to the optical fiber 550. The spectrometer 560 is a device that measures the intensity of light received by the optical fiber 550 and outputs it as an electrical signal. The spectrometer 560 may employ a spectrometer of a known structure.

The first optical system 510 is disposed between the objective lens 150 and the optical fiber 550. For example, the first optical system 510 may be disposed opposite to the objective lens 150 with the first beam splitter 140 disposed therebetween. The first optical system 510 is an assembly of lens structures and is an optical component that transmits the image of the back focal plane 500 of the objective lens 150 to a preset position as it is. When the light receiving unit of the optical fiber 550 is directly installed on the back focal plane 500 of the objective lens 150, the first optical system 510 may not be provided.

The second camera 530 is a device for acquiring the image transmitted by the first optical system 510. That is, the second camera 530 is a device provided so that the user may observe the image of the back focal plane 500 in real time. More specifically, the second camera 530 is provided so that the user may directly observe the arrangement position of the light receiving unit of the optical fiber 550. The second camera 530 may not be provided as needed.

The third beam splitter 520 is disposed between the first optical system 510 and the second camera 530. The third beam splitter 520 splits the reflected light transmitted from the first optical system 510 toward the optical fiber 550 and the second camera 530. That is, the third beam splitter 520 is required when the second camera 530 is installed, and may not be provided when the second camera 530 is not installed.

The system for measuring the thickness and properties of a thin film using a spatial light modulator according to the inventive concept is characterized in that it forms a coaxial optical system in which the traveling direction of incident light and the traveling direction of reflected light are the same with respect to the objective lens 150.

Referring to FIG. 11, in the system for measuring the thickness and properties of a thin film using a spatial light modulator according to the second embodiment of the inventive concept, components constituting a polarimeter are added to the system shown in FIG. 7. Accordingly, in the description of the configuration of the second embodiment, the description of the configuration overlapping the configuration of the first embodiment will refer to the first embodiment, and detailed description will be omitted.

Compared with the first embodiment, the system of the second embodiment further includes a polarization generating stage and a polarization analyzing stage. The polarization generating stage is a component that adjusts the polarization state of the light incident on the sample 300. The incident light passes through the polarization generating stage to have a desired polarization state. The polarization generating stage may consist of one or more various optical elements, and for example, the polarization generating stage may include at least one of a polarizer 200, a retarder, a retarder 210, and a phase modulator. The polarizer 200 is a component that polarizes the light incident from the light source 100. The retarder 210 is a component that retards the phase of polarized light. The retarder 210 included in the polarization generating stage is an optical element that delays the phase of light polarized through the polarizer 200. These optical elements and their roles are well known to those of ordinary skill in the art to which the inventive concept pertains. Like the electrical elements, the combination of these optical elements may be adjusted so that the incident light has a desired polarization state (linear polarization, circular polarization, elliptically polarized light).

The polarization analyzing stage is a component for analyzing the polarization state of light reflected from the sample 300. The polarization analyzing stage may find out the state of reflected light by, for example, extracting only light of a certain polarization component and measuring its intensity. The polarization analyzing stage may be composed of one or more various optical elements. The polarization analyzing stage may include, for example, at least one of an analyzer 220, a retarder 210, a retarder, and a phase modulator. The analyzer 200 is a component that analyzes the polarization state of the light reflected from the sample 300. The retarder 210 included in the polarization analyzing stage is an optical element that delays the polarization phase of light reflected from the sample 300. These optical elements and their roles are well known to those of ordinary skill in the art to which the inventive concept pertains. Like the electrical elements the combination of these optical elements may be adjusted so that the reflected light may be interpreted into a desired polarization state.

As described above, the polarization generating stage and the polarization analyzing stage may be configured by combining various known optical elements.

The optical elements constituting the polarization generating stage and the polarization analyzing stage are preferably arranged in a fixed state so as not to physically move.

In the second to ninth embodiments to be described below, it is exemplarily shown that the optical elements constituting the polarization generating stage and the polarization analyzing stage may be configured in various arrangements.

The polarizer 200 is installed on the optical axis between the light source 100 and the first beam splitter 140. The analyzer 220 is installed between the first beam splitter 140 and the light receiving unit of the optical fiber 550.

The polarizer 200 may be disposed between the light source 100 and the objective lens 150. Meanwhile, the polarizer 200 may be configured to be included in the spatial light modulator 110. The polarizer 200 may be configured to be included in the first beam splitter 140. The polarizer 200 may be configured to be included in the second beam splitter 130.

The analyzer 220 may be disposed between the objective lens 150 and the optical fiber 550. Meanwhile, the analyzer 220 may be configured to be included in the first beam splitter 140. Meanwhile, the analyzer 220 may be configured to be included in the third beam splitter 520.

A retarder 210 may be installed between the polarizer 200 and the analyzer 220. It is preferable that the retarder 210 has a phase delay of one wavelength or more for the phase of light polarized by the polarizer 200. A phase difference between the s-wave and the P-wave of light incident on the sample 300 may be generated by the retarder 210. Accordingly, more precise and diverse analysis results may be derived. The retarder 210 may be installed to retard the phase of light incident on the sample 300, or may be installed to retard the phase of light reflected from the sample 300. Meanwhile, if necessary, the retarder 210 may be installed to delay both the phases of the light incident on the sample 300 and the light reflected from the sample 300. If necessary, the retarder 210 may not be installed.

In the second embodiment, the polarizer 200 is disposed between the first beam splitter 140 and the second beam splitter 130. Also, an analyzer 220 is disposed between the first beam splitter 140 and the first optical system 510. The retarder 210 is disposed between the polarizer 200 and the first beam splitter 140.

Meanwhile, the third embodiment shown in FIG. 12 is different from the second embodiment in that the retarder 210 is not provided.

Meanwhile, the fourth embodiment shown in FIG. 13 is different from the second embodiment in that the retarder 210 is moved between the first beam splitter 140 and the analyzer 220.

Meanwhile, the fifth embodiment shown in FIG. 14 is different from the second embodiment in that one more retarder 210 is installed. In the fifth embodiment, the retarder 210 is disposed between the polarizer 200 and the first beam splitter 140 and between the first beam splitter 140 and the analyzer 220 on the light propagation path, respectively. That is, the polarizer 200 is disposed between the first beam splitter 140 and the second beam splitter 130. An analyzer 220 is disposed between the first beam splitter 140 and the first optical system 510. A retarder 210 is disposed between the polarizer 200 and the first beam splitter 140. A retarder 210 is disposed between the analyzer 220 and the first optical system 510.

Meanwhile, in the sixth embodiment shown in FIG. 15, the polarizer 200 is installed in the light source 100 compared to the first embodiment. The analyzer 220 is disposed between the first optical system 510 and the third beam splitter 520. A retarder 210 is disposed between the first beam splitter 140 and the second beam splitter 130.

Meanwhile, in the seventh embodiment shown in FIG. 16, the polarizer 200 is installed in the light source 100 compared to the first embodiment. The analyzer 220 is disposed between the third beam splitter 520 and the light receiving unit of the optical fiber 550. In addition, a retarder 210 is disposed between the second beam splitter 130 and the spatial light modulator 110.

Meanwhile, in the eighth embodiment shown in FIG. 17, compared to the first embodiment, the polarizer 200 is included in the spatial light modulator 110. The analyzer 220 is disposed between the first beam splitter 140 and the first optical system 510. In addition, a retarder 210 is disposed between the first beam splitter 140 and the second beam splitter 130.

Meanwhile, in the ninth embodiment shown in FIG. 18, compared to the first embodiment, the polarizer 200 is included in the second beam splitter 130. Also, the analyzer 220 is included in the third beam splitter 520.

Hereinafter, the effect of the inventive concept will be described while describing the path of light in the system for measuring the thickness and properties of a thin film using the spatial light modulator of the second embodiment, which is one of the above-described various embodiments.

As shown in FIG. 19, the light emitted from the light source 100 is modulated into spatial light capable of irradiating only a certain area through the spatial light modulator 110. The light modulated as spatial light passes through the first optical system 510, the second beam splitter 130, the polarizer 200, and the retarder 210 sequentially, and then is refracted by the first beam splitter 140 and is collected by the objective lens 150 and is irradiated to the surface of the sample 300. A part of light passes through the sample 300, and the remaining light is reflected from the sample 300, and passes through the objective lens 150, and is refracted by the first beam splitter 140, and is again refracted by the second beam splitter 130 and is acquired as an image by the first camera 170 through the third optical system 160. The user may check the image of the spatial light formed on the surface of the sample 300 through the second camera 530. As shown in FIG. 20, a user may check an image in which an incident beam is irradiated only to a certain region of interest of the sample 300 by the spatial light modulator 110 and the objective lens 150 through the first camera 170.

In this process, there are a polarizer 200 and an analyzer 220 for adjusting the polarization state of light incident or reflected on the sample 300, and when light is incident from the spatial light modulator 110 to the sample 300, the polarization state of the incident light passing through the polarizer 200 and the retarder 210 is modulated. The light reflected from the sample 300 passes through the analyzer 220 to analyze the polarization state. It has been described above that the retarder 210 used herein preferably has a phase delay amount of one wavelength or more. Referring to the various embodiments described above, the order and configuration (number) of the polarizer 200, the analyzer 220, and the retarder 210 may be different. In addition, some of the polarizer 200, the analyzer 220 and the retarder 210 may be implemented in an integrated configuration with the light source 100, the first beam splitter 140, the second beam splitter 130, and the third beam splitter 520, and may be configured to be integrated with the spatial light modulator 110.

Now, the process of measuring the spectral signal of the reflected light reflected from the sample 300 will be described. Referring to FIG. 21, the reflected light reflected from the surface of the sample 300 passes through the back focal plane 500 of the objective lens 150 and then passes through the first beam splitter 140 and is transmitted to the third beam splitter 520 by the first optical system 510. The reflected light from the third beam splitter 520 is separated in two directions, and a part thereof is transmitted to the spectrometer 560 through the light receiving unit of the optical fiber 550. Meanwhile, the remaining part of the reflected light is acquired as an image from the second camera 530. The image acquired by the second camera 530 is an image formed in the back focal plane 500. In this process, the light receiving unit of the optical fiber 550 has a narrow cross-sectional area to receive light corresponding to a certain area among the areas of reflected light passing through the back focal plane 500 of the objective lens 150. In addition, the light receiving unit of the optical fiber 550 may be moved in two dimensions by the transfer device 540. Accordingly, as shown in FIG. 22, the position of the light receiving unit of the optical fiber 550 may be visually confirmed through the second camera 530 that may confirm the image of the back focal plane 500. As the light receiving unit of the optical fiber 550 acquires only the spectral signal corresponding to a certain position of the back focal plane 500 of the objective lens 150, only a signal corresponding to a certain incident angle and azimuth ω reflected from the sample 300 is measured by the spectrometer 560.

There is a relationship as shown in FIG. 23 between the back focal plane 500 of the objective lens and the sample 300. As may be seen in FIG. 23, all rays originating from a certain position of the back focal plane 500 become light incident or reflected at the same angle on the upper surface of the sample 300. Let the radial distance of the back focal plane 500 be r, the circumferential angle be ω, and when light is irradiated to an area corresponding to a point in the corresponding position, the irradiated light is incident as light having an incident angle <<img1>> on the upper surface.

Here, NA is the numerical aperture of the objective lens. As a result, light having a certain incident angle may be selected by irradiating only a part of the back focal plane 500 region of the objective lens 150 or selecting it. In the inventive concept, as an embodiment that enables such a selection process, the cross-sectional area of the light receiving unit of the optical fiber 550 is reduced to implement this. A photograph of the back focal plane 500 of the objective lens 150 and the light receiving unit of the optical fiber 550 by using a second camera 530 that takes an image of the back focal plane 500 of the objective lens 150 is shown in FIG. 22.

The change of the optical signal until the light irradiated from the light source 100 along the above path is acquired as a spectral signal through the spectrometer 560 is expressed as an equation as follows.

When the amount of light $I_0(\sigma)$ according to the wavelength ($\sigma=1/\lambda$) comes from the light source, the reflected light $I(\sigma)$ is expressed by the formula of Mueller matrix and Stokes vector as follows.

$$I(\sigma) = [1\ 0\ 0\ 0] A_{45°} \cdot M_{sample} \cdot C_{45°,\Phi(\sigma)} P_0 \cdot [I_0(\sigma)\ 0\ 0\ 0]^T$$

Here, the Mueller matrix of each polarization optical component and sample is as follows.

$$P_0^* = R(-0°)\frac{1}{2}\begin{bmatrix} 1 & 1 & 0 & 0 \\ 1 & 1 & 0 & 0 \\ 0 & 0 & 0 & 0 \\ 0 & 0 & 0 & 0 \end{bmatrix} R(0°)$$

$$R(\theta) = \begin{bmatrix} 1 & 0 & 0 & 0 \\ 0 & \cos(2\theta) & \sin(2\theta) & 0 \\ 0 & -\sin(2\theta) & \cos(2\theta) & 0 \\ 0 & 0 & 0 & 1 \end{bmatrix}$$

$$C_{45°,\Phi(\sigma)} = R(-45°)\frac{1}{2}\begin{bmatrix} 1 & 0 & 0 & 0 \\ 0 & 1 & 0 & 0 \\ 0 & 0 & \cos(\Phi(\sigma)) & \sin(\Phi(\sigma)) \\ 0 & 0 & -\sin(\Phi(\sigma)) & \cos(\Phi(\sigma)) \end{bmatrix} R(45°)$$

$$\Phi(\sigma) = 2\pi\Delta n d,$$

d is the thickness of the birefringence retarder, and $\Delta n$ is the birefringence of the retarder.

$$A_{45°} = R(-45°)\frac{1}{2}\begin{bmatrix} 1 & 1 & 0 & 0 \\ 1 & 1 & 0 & 0 \\ 0 & 0 & 0 & 0 \\ 0 & 0 & 0 & 0 \end{bmatrix} R(45°),$$

$$M_{sample} = \frac{|\tilde{r}_p| + |\tilde{r}_s|}{2}\begin{bmatrix} 1 & -\cos(2\Psi) & 0 & 0 \\ \cos(2\Psi) & 1 & 0 & 0 \\ 0 & 0 & \sin(2\Psi)\cos(\Delta) & \sin(2\Psi)\sin(\Delta) \\ 0 & 0 & -\sin(2\Psi)\sin(\Delta) & \sin(2\Psi)\cos(\Delta) \end{bmatrix}$$

Putting this together, it becomes $$I(\sigma) = \frac{I_0(\sigma)}{4}\{1 - \cos(2\Psi)\cos(\Phi(\sigma)) + \sin(2\Psi)\sin(\Delta)\sin(\Phi(\sigma))\}.$$

This is expressed simply as follows.

$$I(\sigma) = a_0 + a_1 \cos(\Phi(\sigma)) + b_1 \sin(\Phi(\sigma))$$

If we express the Retardance of Multi-Order Retarder as having a linear relation with respect to wave number as follows, $$\Phi(\sigma) = 2\pi L\sigma + \gamma(\sigma),\ L = \frac{1}{2\pi}\frac{\partial \Phi}{\partial \sigma},\ \gamma(\sigma) \approx 0,$$

The Fourier transform ($\tilde{F}\{\ \}$) of $I(\sigma)$ may be expressed as follows.

$$\tilde{F}\{a_0(\sigma)\} = \frac{1}{\sqrt{2\pi}} \int_{-\infty}^{\infty} a_0(\sigma) e^{-2\pi j h\sigma} d\sigma = A_0(h),\ \tilde{F}\{a_1(\sigma)\} = A_1(h),\ \tilde{F}\{b_1(\sigma)\} = B_1(h)$$

$$\tilde{F}\{a_1(\sigma)\cos(\Phi(\sigma))\} = \frac{1}{2}\left[\tilde{F}\{a_1(\sigma)e^{2\pi jL\sigma}\} + \tilde{F}\{a_1(\sigma)e^{-2\pi jL\sigma}\}\right]$$

$$= \frac{1}{2\sqrt{2\pi}}\left[\int_{-\infty}^{\infty} a_1(\sigma)e^{-2\pi j(h-L)\sigma} d\sigma + \int_{-\infty}^{\infty} a_1(\sigma)e^{-2\pi j(h+L)\sigma} d\sigma\right]$$

$$= \frac{1}{2}\left[A_1(h-L) + A_1(h+L)\right] = \frac{1}{2}[A_1(h-L) + A_1^*(-h-L)]$$

-continued $$\tilde{F}\{b_1(\sigma)\sin(\Phi(\sigma))\} = \frac{1}{2j}[\tilde{F}\{b_1(\sigma)e^{2\pi jL\sigma}\} - \tilde{F}\{b_1(\sigma)e^{-2\pi jL\sigma}\}]$$

$$= \frac{1}{2j\sqrt{2\pi}}\left[\int_{-\infty}^{\infty} b_1(\sigma)e^{-2\pi j(h-L)\sigma}d\sigma - \int_{-\infty}^{\infty} b_1(\sigma)e^{-2\pi j(h+L)\sigma}d\sigma\right]$$

$$= \frac{1}{2j}[B_1(h-L) - B_1(h+L)] = \frac{1}{2j}[B_1(h-L) + B_1^*(-h-L)]$$

$$\therefore \tilde{F}\{I(\sigma)\} = A_0(h) + \frac{1}{2}\left[A_1(h-L) + A_1^*(-h-L) + \frac{1}{2}[B_1(h-L) - B_1^*(-h-L)]\right]$$

As a result, after the Fourier transform of the reflected light I($\sigma$), a signal may be obtained by separating the DC component $A_0$(h) and the real part $A_1$(h-L) and the imaginary part $B_1$(h-L) of the signal shifted by L, respectively, and through the inverse Fourier transform for each of these, incident light information $I_0(\sigma)$ and sample information $\cos(24\psi)$ and $\sin(2\psi)\sin(\Delta)$ may be measured. The result of confirming this series of processes through an experiment is shown in FIG. 24.

In the spectral spectrum shown in the upper part of FIG. 25, the horizontal axis is the wavelength, and the vertical axis is the measured intensity of reflected light, and the graph shown below is the calculated reflectance and the theoretical reflectivity. In FIG. 25, the incident angle of the light receiving unit on the back focal plane 500 of the objective lens 150 among the reflected light of the thin film sample was set to 25.13°, and the intensity of the reflected light at the incident angle was measured. Referring to FIG. 25, according to the spectral spectrum measured from samples of 4 thicknesses (top) and the calculated reflectivity and theoretical reflectivity comparison results (bottom) based on the spectral spectrum, it may be seen that the theoretical thickness and the result of the calculated thickness by spectroscopic measurement match well.

On the other hand, when the signal of each irradiation area is analyzed by sequentially irradiating a certain area within the sample 300 using the spatial light modulator 110 as shown in the left figure of FIG. 26, spectroscopic ellipsometry measurement of the sample area becomes possible. Based on this method, the figure on the right of FIG. 26 shows the results of calculating and plotting the regions of the $SiO_2$/Si specimens of four thicknesses (100 nm, 200 nm, 500 nm, and 1000 nm) in a 10×10 grid size, respectively. As a result, as an embodiment of the inventive concept, it was confirmed that it was possible to be implemented as imaging spectroscopic ellipsometry, and as a result, it was confirmed that thickness measurement of the region was possible.

In addition, the system for measuring the thickness and properties of a thin film using a spatial light modulator according to the inventive concept has the advantage of increasing the measurement convenience and measurement limit in the industrial field. As the size of semiconductor and display patterns decreases and the degree of integration increases, the importance of discriminating signals corresponding to certain pattern positions using a high magnification optical system, that is, improving spatial resolution, is emerging. As may be seen in FIG. 27, the higher the magnification of the objective lens, the shorter the working distance becomes such that in the case of ellipsometry having a conventional inclined incident reflection structure, there is a limit to using a lens having a magnification of 10× or more. This makes it difficult to perform measurements with high spatial resolution in a tilted optical system structure. In addition, in the case of imaging ellipsometry having an oblique incident reflection structure, image distortion and defocusing due to oblique imaging inevitably occur. This causes distortion in the measurement signal. On the other hand, compared to the inclined optical system, the coaxial optical system of the inventive concept may solve the problems of the inclined optical system structure, and additionally, it is easy to adjust the focal length between the sample and the optical system, and in addition, the system according to the inventive concept has the advantage that the risk of collision between the sample and the lens during equipment operation is reduced. In the inventive concept, a coaxial optical system configuration was invented by paying attention to the fact that an optical signal corresponding to a certain position of the objective lens back focal plane is a signal corresponding to a certain incident angle in the sample.

The system according to the inventive concept consists of a physically fixed polarization generating stage and a polarization analyzing stage arrangement. Accordingly, there is an advantage in that the measurement accuracy may be increased and the measurement time may be reduced. A rotating retarder, Liquid Crystal, etc. used in general ellipsometry may cause measurement errors due to movement of a polarization modulator component as shown in FIG. 28. When polarization is modulated through mechanical rotation, a beam drifting error that changes the optical path occurs due to minute misalignment of optical components. On the other hand, in the case of electrically polarization modulation, an anchoring layer for restoring force of liquid crystal is formed at the boundary, resulting in an error in the actual amount of polarization phase delay. As a result, a measurement error occurs, such as a change in the optical path, a decrease in the amount of light, or no phase delay by an intended amount. In addition, since the actuation of the polarization modulator involves mechanical movement inside the component, an increase in measurement time for driving and stabilizing the polarization modulator is caused. In the inventive concept, by adopting a multi-order retarder, the amplitude $\psi$ and phase $\Delta$ signals according to the wavelength of the sample were implemented to be modulated into high-frequency signals in the wavelength domain such that the ellipsometry measurement was implemented only by measuring the spectral spectrum without driving the polarization modulator. As a result, the system according to the inventive concept has the advantage of being able to measure ellipsometry at a high speed without the above-described measurement error.

In the case of conventional imaging ellipsometry, since a camera is used as a detector, it is difficult to analyze multiple wavelengths. In some studies, a method of acquiring a spectral signal for a region by using a plurality of short-wavelength filters or by performing spectral imaging through a diffraction grating has been proposed but as described above, this results in a problem in that a measurement time becomes longer due to an increase in a measurement sequence, or a spatial resolution of a region deteriorates.

In ellipsometry measurement, spectral signal analysis has the advantage of improving measurement accuracy and precision. By comparing the polarization signals $\psi_{measure}$ and $\Delta_{measure}$ finally measured through ellipsometry measurement with the signals $\psi_{theory}$ and $\Delta_{theory}$ calculated through the reflectivity theory that fits the sample characteristics, through nonlinear fitting, desired information (thin film thickness, refractive index, sample shape, etc.) may be calculated from the sample. Since the polarization signals $\psi_{theory}$ and $\Delta_{theory}$ are functions according to the wavelength of light, the angle of incidence, etc., to avoid problems such as local minimum in the nonlinear fitting process, it is advantageous and known to use a broad-band spectral analysis or a multi-incidence angle analysis. The greater the change in the measurement signal, the greater the sensitivity of the measurement, and the faster it converges to the local minimum, and in general, since the signal change according to the wavelength is larger than the signal change according to the angle of incidence, it is advantageous for the ellipsometer analysis to obtain the spectral signal. In the inventive concept, since a signal of a certain area is obtained using a spectrometer rather than a conventional camera detector, and a spectral ellipsometer signal is obtained through this, in ellipsometry signal analysis, it has higher measurement accuracy and precision compared to conventional imaging ellipsometry.

Conventional imaging ellipsometry performs measurements at fixed angles of incidence and reflection, and to adjust the angle of incidence and azimuth ω, the alignment of the optical system is changed, so the sample focus and the measurement position must be adjusted together. In the inventive concept, while having a coaxial optical system configuration, an optical signal corresponding to one point of the back focal plane of the objective lens is used as a signal corresponding to a certain incident angle and azimuth angle reflected from the sample. For this reason, by controlling the transfer device that may control the position of the light receiving unit of the optical fiber connected to the spectrometer, there is an advantage in that it is possible to easily select and measure the certain incident angle and azimuth signal of the reflected light as desired.

As a result, through this configuration, by irradiating only the certain area to be measured on the sample surface with a high magnification objective lens and spatial light modulator, and changing the irradiation area variably, the small spot size enables measurement of spectral reflectivity of an area (Imaging Reflectometry), and by using the back focal plane property of the objective lens, even in a coaxial optical system configuration, a spectral reflectance signal corresponding to a certain incident angle and azimuth may be acquired, thereby providing an effect that may solve the problems of the conventional imaging spectroscopic reflectometry. Meanwhile, in this process, since multi-order phase delay is possible by the combination of the polarization generating stage, the polarization analyzing stage, and the retarder, a reflectometer signal or an ellipsometry signal may be obtained by one-shot spectral signal acquisition.

As described above, in relation to a system for measuring the thickness and properties of a thin film using a spatial light modulator according to the inventive concept, through the spatial light modulator, incident light may be irradiated only to the certain area of the sample, so the measurement resolution is remarkably improved and since the light receiving unit of the optical fiber is arranged so that only the reflected signal of a certain angle of incidence passing through the back focal plane of the objective lens may be acquired and analyzed, the effect of significantly improving the wavelength resolution is provided by excluding the effect of multiple incident angles and using a spectrometer as a detector.

In addition, as in a preferred embodiment of the inventive concept, if a polarization generating stage that does not physically move is disposed on the path of the incident light and a polarization analysis stage that does not physically move is placed on the path of the reflected light, it is possible to control the polarization of the incident light incident on the sample and thus, serve as a polarimeter. In addition, while the coaxial optical system eliminates the distortion that occurs in the oblique image and reduces the spot size of the incident light by applying a high magnification objective lens, the position of incident light may be changed by the spatial light modulator, such that it is possible to measure a large area, and using a spectrometer as a detector has the advantage of measuring a signal with high wavelength resolution in the two-dimensional area of the sample. In addition, when the polarization generating stage and the polarization analyzing stage have a physically fixed structure in the polarization modulation process, the measurement time and the measurement sequence are significantly shortened compared to the conventional ellipsometry.

Above, the inventive concept has been described with reference to preferred embodiments, but the inventive concept is not limited by such examples, and various types of embodiments may be embodied within the scope without departing from the technical spirit of the inventive concept.

MODE FOR INVENTION

To achieve the above object, a system for measuring thickness and properties of a thin film using a spatial light modulator according to the inventive concept includes: a spatial light modulator that performs spatial modulation so that light emitted from a light source irradiates only a certain area of a sample;
    a first beam splitter that changes the direction of the light modulated by the spatial light modulator and passes a part of the reflected light reflected from the sample;
    an objective lens that condenses the light refracted by the first beam splitter to a certain area of the sample;
    a second beam splitter in which a part of the reflected light reflected from the sample is separated from the first beam splitter and changed after being incident;
    a first camera that acquires a surface image of the sample by the reflected light incident from the second beam splitter;
    an optical fiber equipped with a light receiving unit to receive reflected light passing through a certain area of the back focal plane of the objective lens; and
    a spectrometer that measures the intensity of light received from the optical fiber and outputs it as an electrical signal.

It is preferable that the first optical system is disposed between the objective lens and the optical fiber and transmits an image of a back focal plane of the objective lens to a preset position as it is.

It may include: a second camera that acquires the image transmitted by the first optical system; and
    a third beam splitter that is disposed between the first optical system and the first camera and separates the reflected light transmitted from the first optical system in the direction of the optical fiber and the second camera.

Preferably, the light receiving unit of the optical fiber may be moved two-dimensionally by a transfer device.

The spatial light modulator may include any one of a Digital Mirror Device (DMD), Digital Light Processing (DLP), Liquid Crystal (LC) array, Liquid Cell on Silicon (LCoS), and Variable Aperture.

A polarization generating stage for controlling the polarization state of light incident on the sample; and
a polarization analyzing stage for analyzing the polarization state of light reflected from the sample are provided.

The polarization generating stage includes a polarizer that polarizes the light incident from the light source, and The polarization analyzing stage may include an analyzer for analyzing the polarization state of light reflected from the sample.

The polarization generating stage may include a retarder that retards the phase of light polarized through the polarizer.

The polarization analyzing stage may include a retarder for delaying the polarization phase of light reflected from the sample.

The polarization generating stage and the polarization analyzing stage are preferably arranged in a fixed state so as not to physically move.

The polarizer is disposed between the light source and the objective lens, and

The analyzer may be disposed between the objective lens and the optical fiber.

The polarizer may be configured to be included in the spatial light modulator.

The polarizer may be configured to be included in the first beam splitter.

The analyzer may be configured to be included in the first beam splitter.

The polarizer may be configured to be included in the second beam splitter.

The analyzer may be configured to be included in a third beam splitter that separates the reflected light transmitted from the first optical system in a direction of the optical fiber and a second camera that acquires an image transmitted by the first optical system.

The invention claimed is:

1. System for measuring the thickness and properties of a thin film using a spatial light modulator, the system comprising:
a spatial light modulator configured to spatially modulate light from a light source and irradiate only a certain area of a sample;
a first beam splitter configured to change a direction of the light modulated by the spatial light modulator and pass a part of a reflected light reflected from the sample;
an objective lens configured to condense the light refracted by the first beam splitter to a certain area of the sample;
a second beam splitter in which a part of the reflected light reflected from the sample is separated from the first beam splitter and changed after being incident;
a first camera configured to acquire a surface image of the sample by the reflected light incident from the second beam splitter;
an optical fiber equipped with a light receiving unit to receive reflected light that passed through a certain area of a back focal plane of the objective lens;
a spectrometer configured to measure an intensity of light received from the optical fiber and output the measured intensity as an electrical signal;
a first optical system disposed between the objective lens and the optical fiber and configured to transmit the image of the back focal plane of the objective lens to a preset position as it is;
a second camera configured to acquire an image transmitted by the first optical system; and
a third beam splitter disposed between the first optical system and the first camera and configured to separate the reflected light transmitted from the first optical system toward the optical fiber and the second camera.

2. The system for measuring the thickness and properties of a thin film using a spatial light modulator of claim 1, wherein the light receiving unit of the optical fiber is moved two-dimensionally by a transfer device.

3. The system for measuring the thickness and properties of a thin film using a spatial light modulator of claim 1, wherein the spatial light modulator comprises any one of a digital mirror device (DMID), digital light processing (DLP), a liquid crystal (LC) array, liquid cell on silicon (LCoS), and a variable aperture.

4. The system for measuring the thickness and properties of a thin film using a spatial light modulator of claim 1, further comprising:
a polarization generating stage configured to control a polarization state of light incident on the sample; and
a polarization analyzing stage configured to analyze a polarization state of light reflected from the sample.

5. The system for measuring the thickness and properties of a thin film using a spatial light modulator of claim 4, wherein the polarization generating stage and the polarization analyzing stage are arranged in a fixed state so as not to physically move.

6. The system for measuring the thickness and properties of a thin film using a spatial light modulator of claim 4, wherein the polarization generating stage comprises a polarizer that polarizes the light incident from the light source,
wherein the polarization analyzing stage comprises an analyzer that analyzes the polarization state of light reflected from the sample.

7. The system for measuring the thickness and properties of a thin film using a spatial light modulator of claim 6, wherein the polarization generating stage comprises a retarder configured to delay a phase of light polarized through the polarizer.

8. The system for measuring the thickness and properties of a thin film using a spatial light modulator of claim 6, wherein the polarization analysis stage comprises a retarder configured to delay a polarization phase of light reflected from the sample.

9. The system for measuring the thickness and properties of a thin film using a spatial light modulator of claim 6, wherein the polarizer is disposed between the light source and the objective lens,
wherein the analyzer is disposed between the objective lens and the optical fiber.

10. The system for measuring the thickness and properties of a thin film using a spatial light modulator of claim 6, wherein the polarizer is configured to be included in the spatial light modulator.

11. The system for measuring the thickness and properties of a thin film using a spatial light modulator of claim 6, wherein the polarizer is configured to be included in the first beam splitter.

12. The system for measuring the thickness and properties of a thin film using a spatial light modulator of claim 6, wherein the analyzer is configured to be included in the first beam splitter.

13. The system for measuring the thickness and properties of a thin film using a spatial light modulator of claim 6, wherein the polarizer is configured to be included in the second beam splitter.

14. The system for measuring the thickness and properties of a thin film using a spatial light modulator of claim 6, wherein the analyzer is configured to be included in a third beam splitter that separates the reflected light transmitted from the first optical system in the direction of the optical fiber and a second camera for obtaining an image transmitted by the first optical system.

* * * * *